US009925955B2

(12) United States Patent
Watanabe

(10) Patent No.: US 9,925,955 B2
(45) Date of Patent: Mar. 27, 2018

(54) ON-BOARD COMMUNICATION SYSTEM, AND ON-BOARD DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Akiyo Watanabe, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 7 days.

(21) Appl. No.: 15/311,724

(22) PCT Filed: Jul. 27, 2015

(86) PCT No.: PCT/JP2015/071222
§ 371 (c)(1),
(2) Date: Nov. 16, 2016

(87) PCT Pub. No.: WO2016/013680
PCT Pub. Date: Jan. 28, 2016

(65) Prior Publication Data
US 2017/0096124 A1  Apr. 6, 2017

(30) Foreign Application Priority Data

Jul. 25, 2014  (JP) .................................. 2014-152093

(51) Int. Cl.
*H04M 1/00* (2006.01)
*B60R 25/24* (2013.01)
(Continued)

(52) U.S. Cl.
CPC ............ *B60R 25/245* (2013.01); *B60N 2/002* (2013.01); *B60R 25/04* (2013.01); *E05B 81/64* (2013.01);
(Continued)

(58) Field of Classification Search
CPC ... B60R 25/245; B60R 25/04; B60R 2325/10; B60R 2325/20; B60N 2/002; E05B 81/64; G08C 17/02; H04W 8/005
See application file for complete search history.

(56) References Cited

U.S. PATENT DOCUMENTS

2008/0258868 A1  10/2008  Nakajima et al.
2010/0231354 A1   9/2010  Nishiguchi et al.
(Continued)

FOREIGN PATENT DOCUMENTS

DE   102011104230 A1    4/2012
JP   P2002-364223 A    12/2002
(Continued)

OTHER PUBLICATIONS

Office Action dated Jul. 5, 2017 in U.S. Appl. No. 15/311,733 filed in the name of Akiyo Watanabe et al.
(Continued)

*Primary Examiner* — Xin Jia
(74) *Attorney, Agent, or Firm* — Oliff PLC

(57) ABSTRACT

In an on-board communication system, an on-board device transmits processing start signals and detection signals from a plurality of antennas provided in a vehicle, and a portable device receives the processing start signals and the detection signals and transmits a response signal that includes infor-
(Continued)

mation corresponding to the received detection signals. Position detection of the portable device is performed based on the response signal. The processing start signals start reception processing of the detection signals by the portable device. The detection signals are successively transmitted from the plurality of antennas, at a different timing for each of the plurality of antennas. Various vehicle processing, such as engine start processing, may be performed based on the detected position of the portable device, such as whether the portable device is inside or outside the vehicle.

7 Claims, 11 Drawing Sheets

(51) Int. Cl.
    *B60R 25/04*     (2013.01)
    *B60N 2/00*     (2006.01)
    *E05B 81/64*     (2014.01)
    *H04W 8/00*     (2009.01)
    *G08C 17/02*     (2006.01)

(52) U.S. Cl.
    CPC ............ *G08C 17/02* (2013.01); *H04W 8/005* (2013.01); *B60R 2325/10* (2013.01); *B60R 2325/20* (2013.01)

(56) References Cited

U.S. PATENT DOCUMENTS

| | | |
|---|---|---|
| 2010/0231465 A1 | 9/2010 | Tanaka |
| 2012/0092129 A1 | 4/2012 | Lickfelt |
| 2012/0271487 A1 | 12/2012 | Lickfelt |

FOREIGN PATENT DOCUMENTS

| | | |
|---|---|---|
| JP | 2010-219628 A | 9/2010 |
| JP | 2010-236346 A | 10/2010 |
| JP | 2011-144624 A | 7/2011 |
| JP | 2012-184609 A | 9/2012 |
| WO | 2015-107609 A1 | 7/2015 |

OTHER PUBLICATIONS

Office Action dated Jul. 6, 2017 in U.S. Appl. No. 15/311,760 filed in the name of Akiyo Watanabe et al.
U.S. Appl. No. 15/311,733, filed Nov. 16, 2016 in the name of Akiyo Watanabe et al.
U.S. Appl. No. 15/311,760, filed Nov. 16, 2016 in the name of Akiyo Watanabe et al.
Aug. 18, 2015 Written Opinion of the International Searching Authority issued in International Patent Application No. PCT/JP2015/071222.
Oct. 6, 2015 Written Opinion of the International Searching Authority issued in International Patent Application No. PCT/JP2015/071208.
Oct. 6, 2015 Written Opinion of the International Searching Authority issued in International Patent Application No. PCT/JP2015/071220.

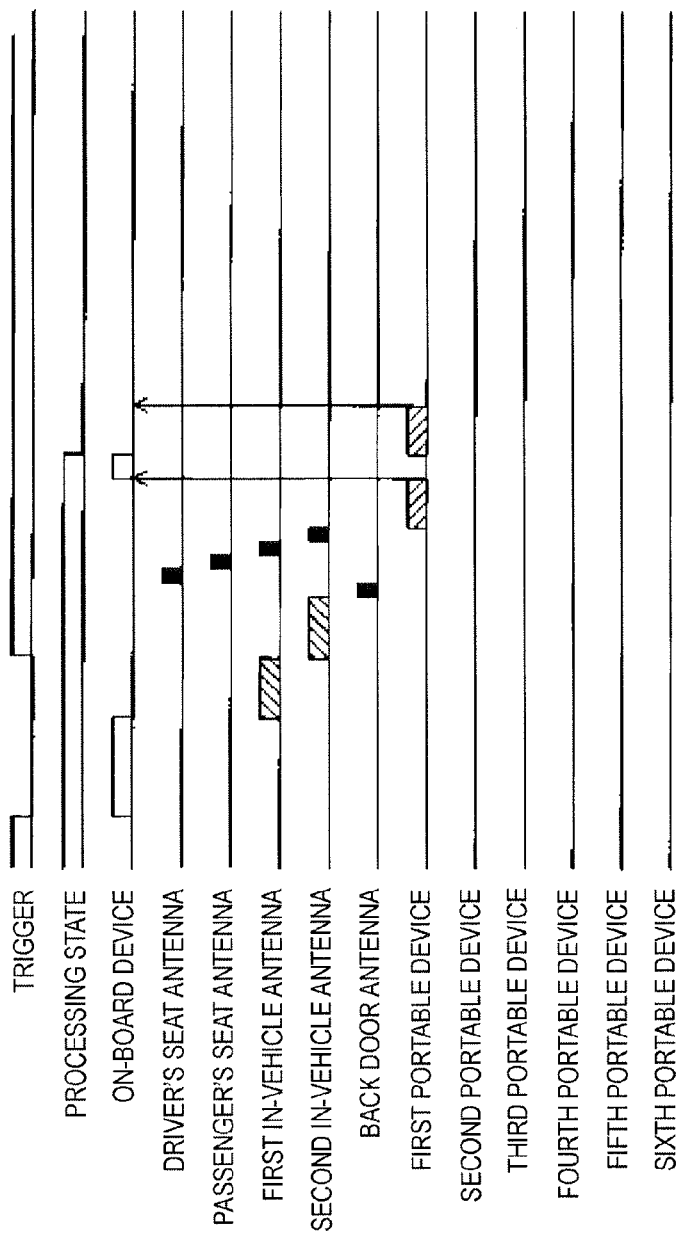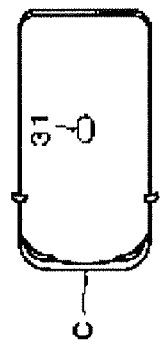
FIG. 6A
FIG. 6B

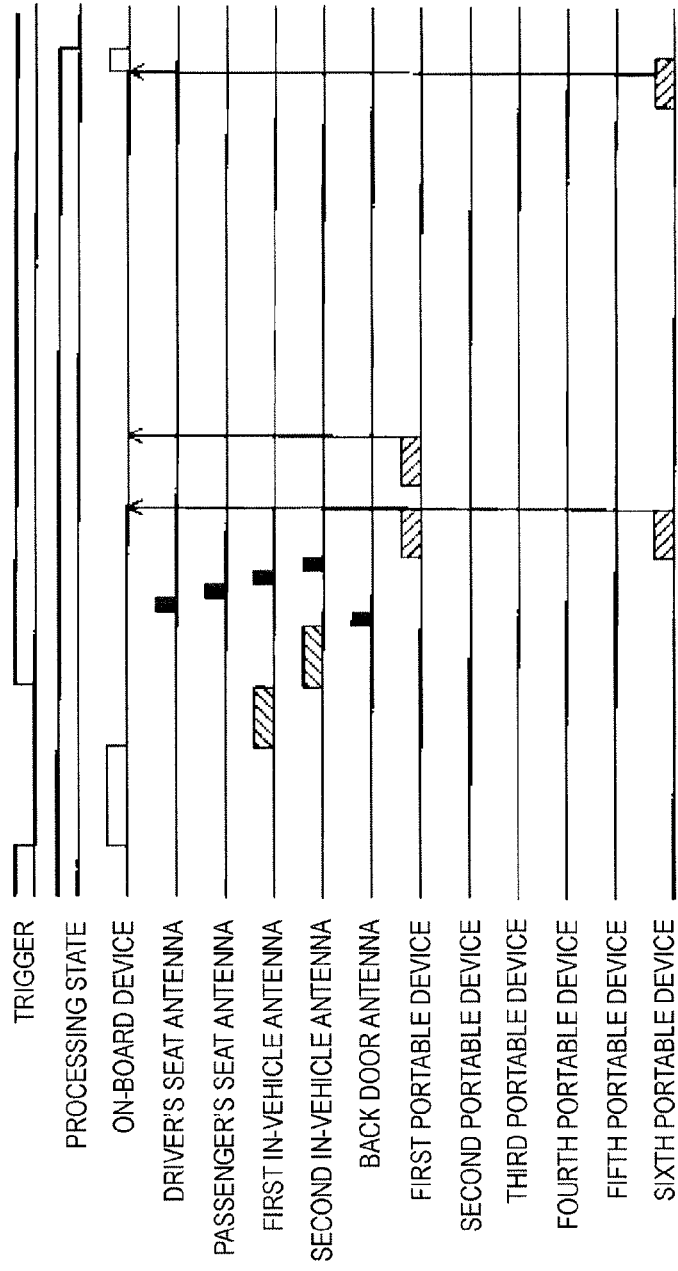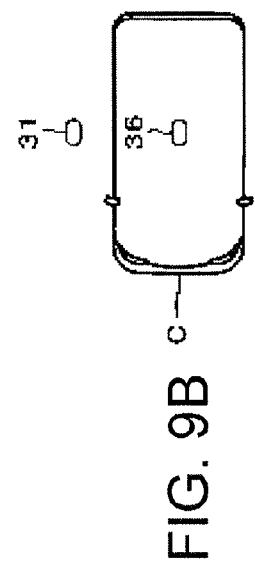

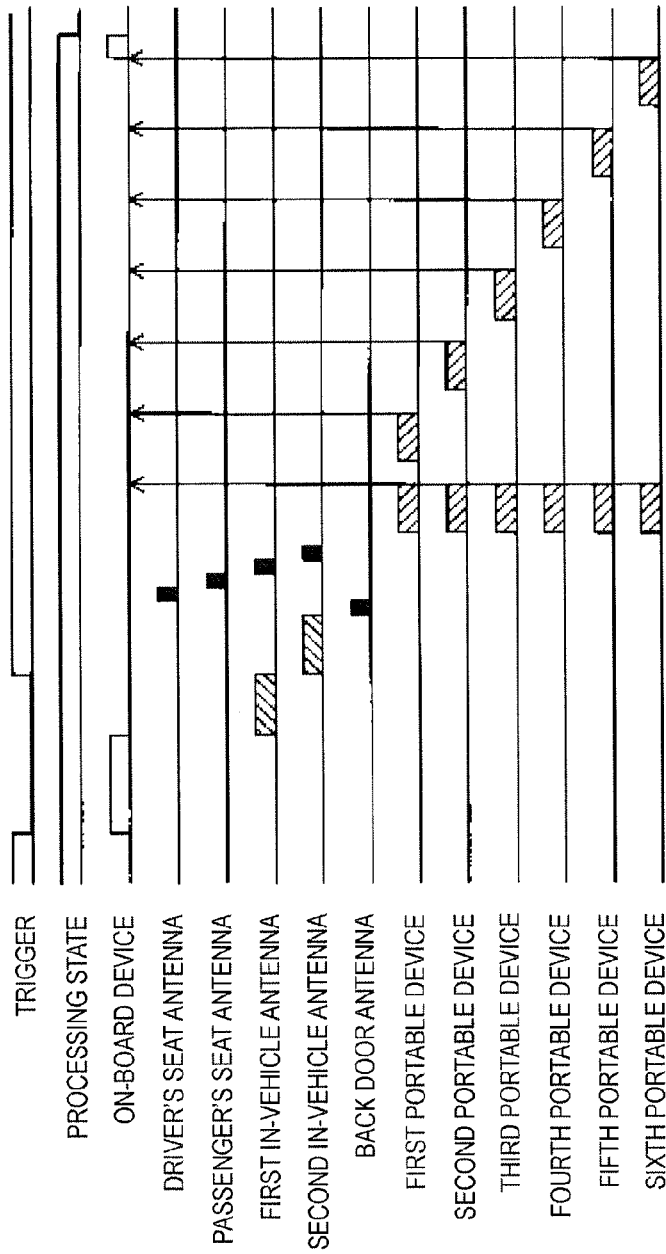
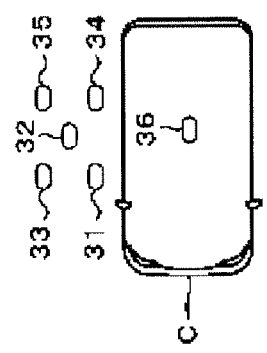
FIG. 10A
FIG. 10B

ON-BOARD COMMUNICATION SYSTEM, AND ON-BOARD DEVICE

This invention relates to an on-board communication system, and to an on-board device that constitutes the on-board communication system.

BACKGROUND

Smart start systems are being utilized, which enable starting of motors installed in vehicles without the use of a mechanical key. Smart start systems are constituted by a portable device possessed by a user, and an on-board device that detects the position of the portable device when an engine start switch is depressed, or when the user grasps the door handle, and performs motor start processing or vehicle door locking or unlocking processing.

When the user depresses the engine start switch, the on-board device transmits wake-up signals from a plurality of LF transmitting antennas provided inside the vehicle, and activates the portable device. The activated portable device transmits to the vehicle a specified signal indicating its existence. When the on-board device receives the specified signal, it transmits, from the LF transmitting antennas, detection signals for detecting the position of the portable device. The portable device receives the detection signals transmitted from the various LF transmitting antennas, and measures the received signal strengths. The portable device then transmits information regarding the measured received signal strengths to the on-board device. The on-board device receives the information regarding the measured received signal strengths from the portable device, determines whether the portable device is inside the vehicle, and performs processing corresponding to the determination result. For example, if the portable device is positioned inside the vehicle, the on-board device performs motor starting processing.

In Publication JP-A-2010-236346 (P2010-236346A), an on-board device and a portable device are disclosed that can shorten processing time. The on-board device improves communication processing speed by simultaneously transmitting signals, with a phase difference provided, from a plurality of LF transmitting antennas inside the vehicle.

Meanwhile, in a conventional smart start system, when there are a plurality of portable devices, a portable device is activated for each LF transmitting antenna, and transmitting and receiving of information necessary for determining whether the activated portable devices are inside or outside the vehicle is separately performed for each portable device.

FIG. 11 is a timing chart that shows signals transmitted and received in conventional portable device position detection processing. In a vehicle, there are provided first through fifth LF transmitting antennas that transmit detection signals for detecting the position of portable devices, and an on-board device transmits various signals such as detection signals from each LF transmitting antenna, and thereby detects the position of the portable devices. There are six portable devices that constitute the smart start system, and the respective portable devices are labeled the first portable device through the sixth portable device. In FIG. 11, "on-board device" is a timing chart showing the processing execution state of an on-board control unit provided in the on-board device. In FIG. 11, "first LF transmitting antenna" through "fifth LF transmitting antenna" are timing charts showing the timing of transmitting signals from the various LF transmitting antennas, and "first portable device" through "sixth portable device" are timing charts showing the timing of transmitting signals from the first through sixth portable devices.

As shown in FIG. 11, in specified cases, the on-board device transmits a wake-up signal from the first LF transmitting antenna. In FIG. 11, the rectangular portions with downward-left hatching show the timing at which the wake-up signal is transmitted. The wake-up signal is transmitted toward the first through sixth portable devices. Each portable device for which the wake-up signal is successfully received is activated from a sleep state, and transmits to the on-board device an ID signal indicating its own existence. In FIG. 11, the rectangular portions with an x-mark show the timing at which ID signals are transmitted. In the example shown in FIG. 11, the first portable device and the second portable device have successfully received the wake-up signal, and each portable device is transmitting its own ID signal to the on-board device.

The on-board device, which has received the ID signals, separately sends detection signals to each activated portable device. For example, when the first portable device and the second portable device have been activated, the on-board device first sends detection signals to the first portable device from the first through sixth LF transmitting antennas. In FIG. 11, the solid black rectangular portions show the timing at which detection signals for detecting portable device position are transmitted. The first portable device measures the received signal strength of the detection signals, and transmits to the on-board device a response signal that includes the received signal strengths obtained by the measurements. In FIG. 11, the rectangular portions with downward-right hatching show the timing at which response signals are transmitted. The on-board device receives the response signal from the first portable device, and performs position detection for the first portable device. That is, the on-board device performs a determination of whether the first portable device is inside the vehicle or outside the vehicle. If the first on portable device is not inside the vehicle, the on-board device sends detection signals to the activated second portable device from the first through sixth LF transmitting antennas, and in the same manner performs position detection for the second portable device.

If the first portable device and the second portable device activated by the wake-up signal from the first LF transmitting antenna are not inside the vehicle, the on-board device next transmits a wake-up signal from the second LF transmitting antenna, and similarly transmits detection signals to the activated portable devices and, based on response signals from the activated portable devices, performs position detection for each portable device. In the example shown in FIG. 11, the third portable device has been activated through the wake-up signal transmitted from the second LF transmitting antenna, and the on-board device performs position detection for the third portable device.

Thereafter, in the same manner, wake-up signals are transmitted from the third through sixth LF transmitting antennas, detection signals are transmitted to the activated portable devices, and position detection is performed for the activated portable devices. The on-board device repeatedly performs the above processing until a portable device is detected inside the vehicle.

SUMMARY

In a conventional smart start system, because it is thus necessary to activate the portable devices by transmitting a wake-up signal from each LF transmitting antenna, there was the problem that time was needed for the position detection of the portable devices, and the subsequent motor starting and/or door locking processing or unlocking processing.

For example, if a user habitually puts a portable device in a handbag and places it in the rear seat of the vehicle, when the engine start switch is depressed, there are cases in which even if a wake-up signal is transmitted from a front LF transmitting antenna inside the vehicle, the portable device in the rear seat cannot be activated. In such a case, the portable device is activated for the first time by transmitting a wake-up signal from a rear LF transmitting antenna inside the vehicle. Therefore, the problem occurs that a user with this type of habit will always have a delay in the engine start timing. In particular, if the portable device is in a position at which it can be activated by the wake-up signal transmitted from the last LF transmitting antenna among a plurality of LF transmitting antennas that transmit wake-up signals, a corresponding amount of time will be needed until the motor starts, and there is a possibility that the user will be irritated or feel a sense of unease about the response of the switch operation.

This invention has been made in consideration of such circumstances, and has an object of providing an on-board communication system, and an on-board device that constitutes the on-board communication system, in which it is possible to shorten the time needed for portable device position detection.

An on-board communication system related to this invention is an on-board communication system provided with (i) an on-board device that transmits detection signals from a plurality of antennas provided in a vehicle and (ii) a portable device that receives the detection signals transmitted from the on-board device and transmits a response signal corresponding to the received detection signals. The on-board device performs position detection of the portable device by receiving the response signal transmitted from the portable device. The on-board device is provided with an on-board transmission unit that (i) prior to transmission of the detection signals, successively transmits from the plurality of antennas, at a different timing for each of the plurality of antennas, a processing start signal for starting reception processing of the detection signals by the portable device, and also (ii) successively transmits the detection signals from the plurality of antennas, at a different timing for each of the plurality of antennas. The portable device is provided with (i) a portable reception unit that receives the processing start signals transmitted by the on-board transmission unit and, in response to the received processing start signals, receives the detection signals transmitted by the on-board transmission unit, and (ii) a portable transmission unit that, when the portable reception unit has received the detection signals, transmits the response signal, which includes information corresponding to the received detection signals.

In an on-board communication system related to this invention, the on-board transmission unit successively transmits the processing start signals and the detection signals.

In an on-board communication system related to this invention, there are a plurality of the portable devices, and when the portable reception units have received the detection signals, the portable transmission units of the plurality of portable devices transmit, at different points in time, (i) a first response signal that includes information corresponding to the received detection signals and (ii) a second response signal that includes the same information as the information included in the first response signal.

In an on-board communication system related to this invention, the plurality of antennas includes a plurality of in-vehicle antennas that transmit, primarily to the inside of the vehicle, the processing start signals and the detection signals, and the on-board transmission unit successively transmits the processing start signals from the plurality of in-vehicle antennas, at a different timing for each of the plurality of in-vehicle antennas.

An on-board device related to this invention is an on-board device that transmits detection signals from a plurality of antennas provided in a vehicle, and performs position detection of an external portable device by receiving a response signal, corresponding to the detection signals, transmitted from the portable device. The on-board device is provided with a detection signal transmission unit that (i) prior to transmission of the detection signals, successively transmits from the plurality of antennas, at a different timing for each of the plurality of antennas, processing start signals for starting reception processing of the detection signals by the portable device, and also (ii) successively transmits the detection signals from the plurality of antennas, at a different timing for each of the plurality of antennas.

In an on-board device related to this invention, the detection signal transmission unit successively transmits the processing start signals and the detection signals.

In this invention, prior to transmission of the detection signals, the on-board transmission unit successively transmits from the plurality of antennas, at a different timing for each of the plurality of antennas, a processing start signal for starting reception processing of the detection signals by the portable device. The portable device, having received the processing start signals, starts reception of the detection signals. It is not necessary for processing start signals to be transmitted from all the antennas. A structure is also acceptable in which, according to the purpose, processing start signals are transmitted from only a plurality of antennas among all the antennas.

After transmitting the processing start signals, the on-board transmission unit transmits from the plurality of antennas provided inside the vehicle, at a different timing for each of the plurality of antennas, detection signals for detecting the position of the portable device. The on-board transmission unit successively transmits the detection signals from the plurality of antennas, without waiting for a response from the portable device. That is, the on-board transmission unit transmits a detection signal from the first antenna, then transmits a detection signal from the second antenna without waiting for a response from the portable device, and thereafter, in the same manner, transmits detection signals from the other antennas.

Therefore, compared to the case of communication being separately performed between each antenna and the portable device, the time needed for communication of information between the on-board device and the portable device can be shortened, and position detection of the portable device can be efficiently performed.

Furthermore, it is not necessary for the on-board transmission unit to successively transmit detection signals from all of the antennas provided inside the vehicle. Structures are also included in the invention in which, at a stage at which detection signals have been transmitted from only a plurality of antennas among all the antennas, a response signal is received from the portable device and then detection signals are transmitted from other antennas. For example, structures are also included in the invention in which, if five antennas are provided inside the vehicle, at the point in time that the on-board transmission unit has transmitted detection signals from four antennas and the portable device has received detection signals from four antennas, a response signal is transmitted to the on-board device.

In this invention, the on-board transmission unit successively transmits the processing start signals and the detection signals. That is, the on-board transmission unit transmits the detection signals after transmission of the processing start signals, without waiting for a response from the portable device that has received the processing start signals. Therefore, the time needed for communication of information between the on-board device and the portable device can be further shortened, and position detection of the portable device can be efficiently performed.

In this invention, the portable transmission unit transmits to the on-board device (i) a first response signal that includes information corresponding to the detection signals received by the portable reception unit and (ii) a second response signal that includes the same information as the information included in the first response signal. When there is a plurality of the portable devices, there is a possibility that first response signals will be transmitted simultaneously from the plurality of portable devices, and that the on-board device will fail to receive the first response signals. However, because the portable devices transmit second response signals that include the same information as the information included in the first response signals, even if the on-board device fails to receive the first response signals, it can receive the second response signals, and position detection of the portable devices can be performed through the second response signals.

In this invention, the on-board transmission unit successively transmits the processing start signals from part of the plurality of antennas, that is, from a plurality of in-vehicle antennas, at a different timing for each of the plurality of in-vehicle antennas. If it is necessary to perform position detection of a portable device that is inside the vehicle, processing start signals are successively transmitted from the plurality of in-vehicle antennas. Generally, this is because when the portable device is inside the vehicle, it is unclear whether the portable device is within the communication range of one in-vehicle antenna, or is within the communication range of another in-vehicle antenna.

By limiting the number of antennas that transmit the processing start signals, the responsiveness of the on-board communication system can be better improved.

Furthermore, in a case in which the on-board communication system is provided with a plurality of out-of-vehicle antennas that transmit processing start signals primarily to the outside of vehicle, and the position of the portable device is approximately assumed, it is not always necessary to successively transmit processing start signals from a plurality of out-of-vehicle antennas. For example, when the switch of a vehicle door is operated and position detection of a portable device is performed, it can be assumed that the portable device is positioned near that vehicle door. Therefore, it is sufficient to transmit a processing start signal from one out-of-vehicle antenna that includes that vehicle door in its communication range.

According to this invention, it is possible to shorten the time needed for position detection of a portable device.

BRIEF DESCRIPTION OF THE DRAWINGS

FIG. 6 is an explanatory diagram showing a first example of processing related to engine starting.

FIG. 9 is an explanatory diagram showing a fourth example of processing related to engine starting.

FIG. 10 is an explanatory diagram showing a fifth example of processing related to engine starting.

DETAILED DESCRIPTION OF EMBODIMENTS

Below, the present invention is described in detail with reference to the drawings, which show exemplary embodiments thereof.

Figure 1:
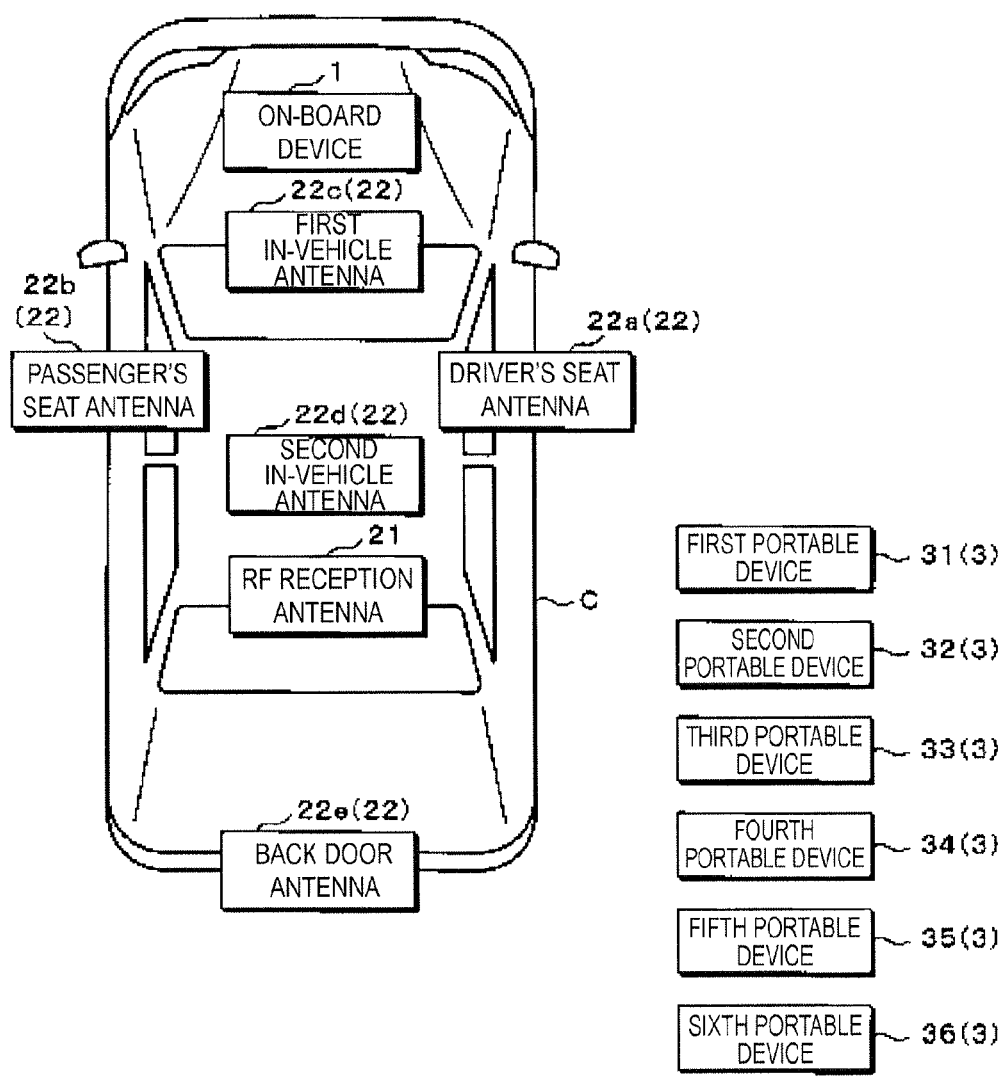
FIG. 1 is a schematic diagram showing a structural example of an on-board communication system.

FIG. 1 is a schematic diagram showing a structural example of an on-board communication system. The on-board communication system according to this exemplary embodiment comprises an on-board device 1 that sends and receives various types of signals using a plurality of LF transmission antennas 22 and an RF reception antenna 21 disposed in a vehicle C, and a plurality of portable devices 3 that send signals to and receive signals from the on-board device 1. The on-board device 1 performs position detection of the portable devices 3, and executes prescribed processing using the results of position detection of the portable devices 3, such as processing to start a motor installed in the vehicle or the like. In this embodiment, position detection refers to a vehicle inside/outside determination that determines whether a portable device 3 is inside the vehicle or outside the vehicle. However, the meaning of position detection in the present invention is not necessarily limited to this.

The plurality of LF transmission antennas 22 is, for example, a driver's seat antenna 22a, a passenger's seat antenna 22b, a first in-vehicle antenna 22c, a second in-vehicle antenna 22d, a back door antenna 22e, and the like, and each of the LF transmission antennas 22 transmits signals using radio waves in the LF band. The LF band is one example of a radio wave band for transmitting signals, but the band is not limited to this. The driver's seat antenna 22a and the passenger's seat antenna 22b are respectively arranged at the pillar on the driver's seat side and at the pillar on the passenger's seat side. The first in-vehicle antenna 22c is disposed at the front of the vehicle C, and the second in-vehicle antenna 22d is arranged at the center of the vehicle C. The back door antenna 22e is arranged at the back door of the vehicle C.

The first in-vehicle antenna 22c and the second in-vehicle antenna 22d are for performing position detection of portable devices 3 inside the vehicle, by transmitting various types of signals primarily to portable devices 3 that are inside the vehicle. The first in-vehicle antenna 22c and the second in-vehicle antenna 22d each transmit various types of signals primarily to in-vehicle areas near the respective various antennas. More specifically, the first in-vehicle antenna 22c and the second in-vehicle antenna 22d function as in-vehicle antennas that transmit processing start signals for causing processing for detecting positions of the portable devices 3 to start, primarily for portable devices 3 inside the vehicle. Detection signals for detecting positions of portable devices 3 have a structure for transmitting from basically all of the LF transmission antennas 22, and even when detecting positions of portable devices 3 outside the vehicle, the first in-vehicle antenna 22c and the second in-vehicle antenna 22d function as antennas that transmit detection signals to the portable devices 3.

The reason two in-vehicle antennas, that is to say the first in-vehicle antenna 22c and the second in-vehicle antenna 22d, are provided is because one LF transmission antenna 22 cannot cover the entire in-vehicle area, or in other words, the portable devices 3 cannot receive the various signals transmitted from one LF transmission antenna 22 in the entire area inside the vehicle.

Meanwhile, the driver's seat antenna 22a, the passenger's seat antenna 22b and the back door antenna 22e primarily transmit various signals to portable devices 3 outside the vehicle, and thereby perform position detection of portable devices 3 outside the vehicle. The driver's seat antenna 22a, the passenger's seat antenna 22b and the back door antenna 22e respectively transmit various signals primarily to areas outside the vehicle near each of the antennas. More specifically, the driver's seat antenna 22a, the passenger's seat antenna 22b and the back door antenna 22e function as out-of-vehicle antennas that transmit processing start signals primarily to portable devices 3 outside the vehicle. The detection signals for detecting the positions of the portable devices 3 have a structure for transmitting from basically all of the LF transmission antennas 22, and even when detecting the positions of portable devices 3 inside the vehicle, the driver's seat antenna 22a, the passenger's seat antenna 22b and the back door antenna 22e function as antennas for transmitting detection signals to the portable devices 3.

In the description below, an example is described in which position detection signals are transmitted from all of the LF transmission antennas 22, but a structure in which detection signals are transmitted from only a portion of the plurality of LF transmission antennas 22 depending on the circumstances is not excluded from the present invention.

In this embodiment, the explanation will assume that six portable devices 3 exist, namely a first portable device 31, a second portable device 32, a third portable device 33, a fourth portable device 34, a fifth portable device 35 and a sixth portable device 36.

Figure 2:
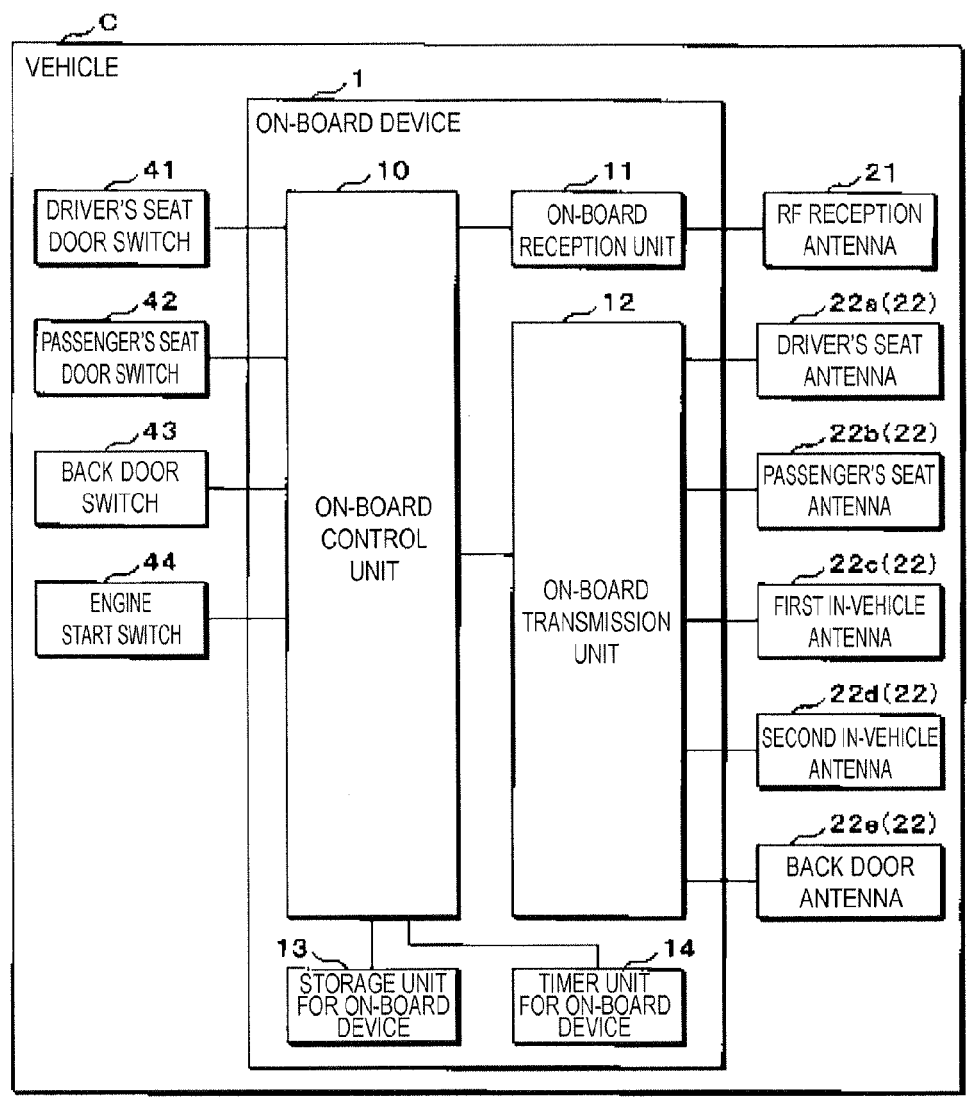
FIG. 2 is a block diagram showing a structural example of an on-board device.

FIG. 2 is a block diagram showing a structural example of an on-board device 1. The on-board device 1 comprises an on-board control unit 10 that controls the actions of the various constituent parts of the on-board device 1. The on-board control unit 10 is a microcomputer including, for example, one or a plurality of central processing units (CPU), multi-core CPU or the like. The on-board control unit 10 is provided with an on-board reception unit 11, an on-board transmission unit 12, a storage unit for on-board device 13 and a timer unit for on-board device 14.

The on-board control unit 10 executes a below-described control program stored in the storage unit for on-board device 13, and thereby controls the actions of the various constituent parts, detects the positions of the portable devices 3 and executes prescribed processing in accordance with the results of position detection.

The storage unit for on-board device 13 is non-volatile memory such as electrically erasable programmable ROM (EEPROM), flash memory or the like. The storage unit for on-board device 13 stores a control program with which the on-board control unit 10 controls the actions of the various constituent parts of the on-board device 1, and thereby accomplishes determinations of whether portable devices 3 are inside or outside the vehicle and executes processing to start a motor installed in the vehicle or the like.

The on-board reception unit 11 is connected to the RF reception antenna 21, receives various signals such as response signals transmitted from the portable devices 3 using UHF-band radio waves, and outputs the received signals to the on-board control unit 10. Because the communicable area with UHF-band radio waves is broad, placement of the RF reception antenna 21 in the vehicle C is not particularly limited.

The on-board transmission unit 12 is connected to the plurality of LF transmission antennas 22, and transmits the detection signals for accomplishing vehicle inside/outside determination of the portable devices 3 under control by the on-board control unit 10. The strength of the detection signals transmitted from each of the LF transmission antennas 22 is set such that the portable devices 3 inside the vehicle or outside the vehicle can receive detection signals from two or more of the LF transmission antennas 22.

The timer unit for on-board device 14 starts timing under control by the on-board control unit 10, and provides the timing results to the on-board control unit 10. The timer unit for on-board device 14 is for accomplishing timeout processing or the like when there has been no response signal from a portable device 3 with regard to the detection signals transmitted from the on-board device 1.

A driver's door switch 41, a passenger's door switch 42 and a back door switch 43 or the like are connected to the on-board control unit 10, and door signals corresponding to the operation state of the door switches are input to the on-board control unit 10. Below, any of the driver's door switch 41, the passenger's door switch 42 and the back door switch 43 is called "door switch" as needed. The on-board control unit 10 can recognize the operation state of the driver's door switch 41, the passenger's door switch 42 and the back door switch 43 on the basis of the door signals from each of the door switches. The driver's door switch 41 or the passenger's door switch 42 is a switch for unlocking or locking the vehicle door on the driver's side or the passenger's side, respectively, and is provided at the outside of the driver's seat or the outside of the passenger's seat. The back door switch 43 is a switch for locking or unlocking the back door that is one of the vehicle doors, and is provided at the outside of the back door. Each door switch is a push button. Instead of a push button, a contact sensor that detects contact by the user on the door handle may be provided. In addition, the on-board control unit 10 may directly acquire the door signal in response to operation of any of the door switches, or may acquire the door signal via a door electronic control unit (ECU), or other ECU, or the like.

In addition, an engine start switch 44 is connected to the on-board control unit 10. The engine start switch 44 is, for example, a push-button-type switch, and is configured such that a start signal corresponding to the on/off state is input to the on-board control unit 10.

Figure 3:
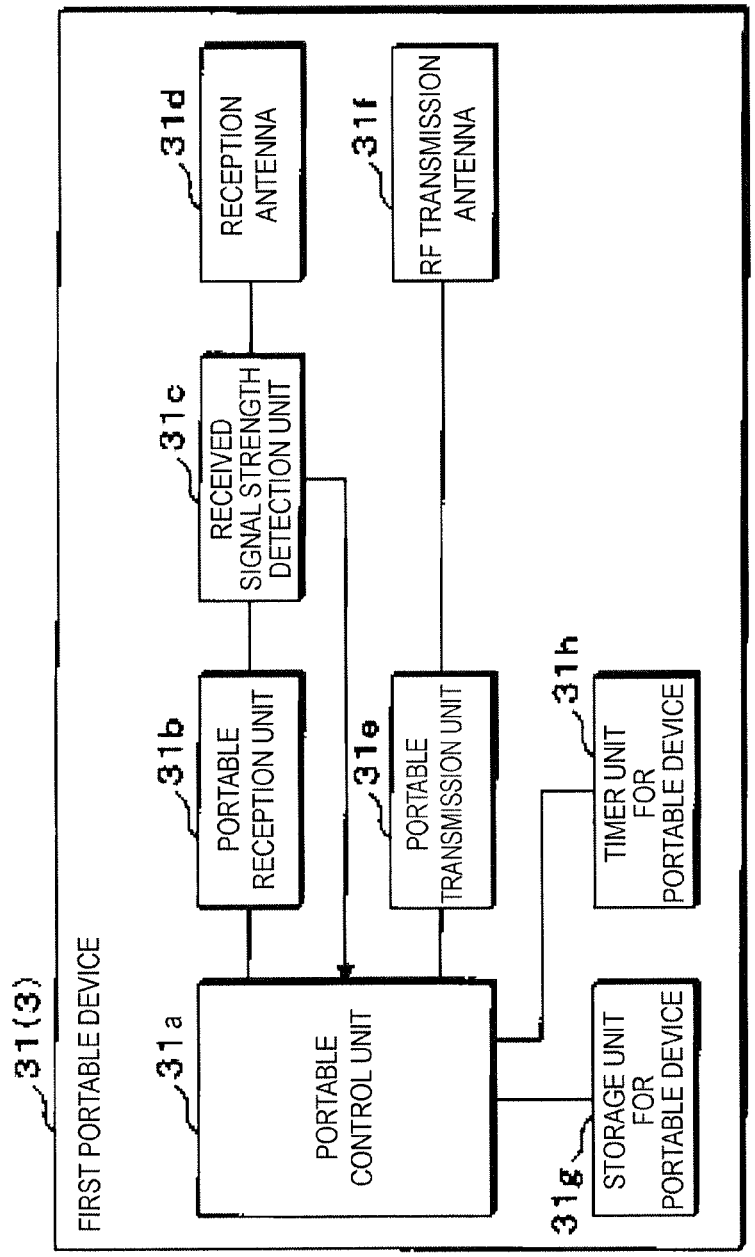
FIG. 3 is a block diagram showing a structural example of a portable device.

FIG. 3 is a block diagram showing a structural example of the portable device 3. The first through sixth portable devices 31, 32, . . ., 36 all have the same structure, so the structure of the first portable device 31 is described and a description of the structure of the other portable devices 3 is omitted. The portable device 3 is provided with a portable control unit 31a that controls the operations of the various constituent parts of the portable device 3. The portable control unit 31a is a microcomputer possessing, for example, one or a plurality of CPUs, a multi-core CPU, or the like. The portable device 3 is provided with a portable reception unit 31b, a portable transmission unit 31e, a storage unit for portable device 31g and a timer unit for portable device 31h.

The portable control unit 31a reads a below-described control program stored in the storage unit for portable device 31g, controls the actions of the various constituent parts, and executes processing that transmits information necessary for the vehicle inside/outside determination of the portable device 3 to the on-board device 1.

The storage unit for portable device 31g is non-volatile memory the same as the storage unit for on-board device 13. The storage unit for portable device 31g stores a control program for executing processing that transmits to the on-board device 1 a response signal or the like including information for accomplishing the vehicle inside/outside determination of the portable device 3, by the portable control unit 31a controlling the operations of the various constituent parts of the portable device 3.

The portable reception unit 31b is connected to a reception antenna 31d via a received signal strength detection unit 31c, receives various signals transmitted from the on-board device 1 using LF-band radio waves, and outputs the signals to the portable control unit 31a. The reception antenna 31d is, for example, a triaxial antenna, and a fixed reception signal strength is obtained regardless of the orientation or attitude of the portable device 3 with respect to the vehicle C.

The received signal strength detection unit 31c is a circuit that detects the received signal strengths of the detection signals received by the reception antenna 31d, and outputs the received signal strengths detected to the portable control unit 31a.

The portable transmission unit 31e is connected to an RF transmission antenna 31f, and transmits response signals corresponding to the detection signals transmitted from the on-board device 1, under control by the portable control unit 31a. The portable transmission unit 31e transmits the response signals using UHF-band radio waves. The UHF band is one example of the radio wave band for transmitting signals, and the band is not limited to this.

The timer unit for portable device 31h starts timing under control by the portable control unit 31a, and provides the timing results to the portable control unit 31a. The timer unit is for measuring the timing of sending response signals.

Figure 4:
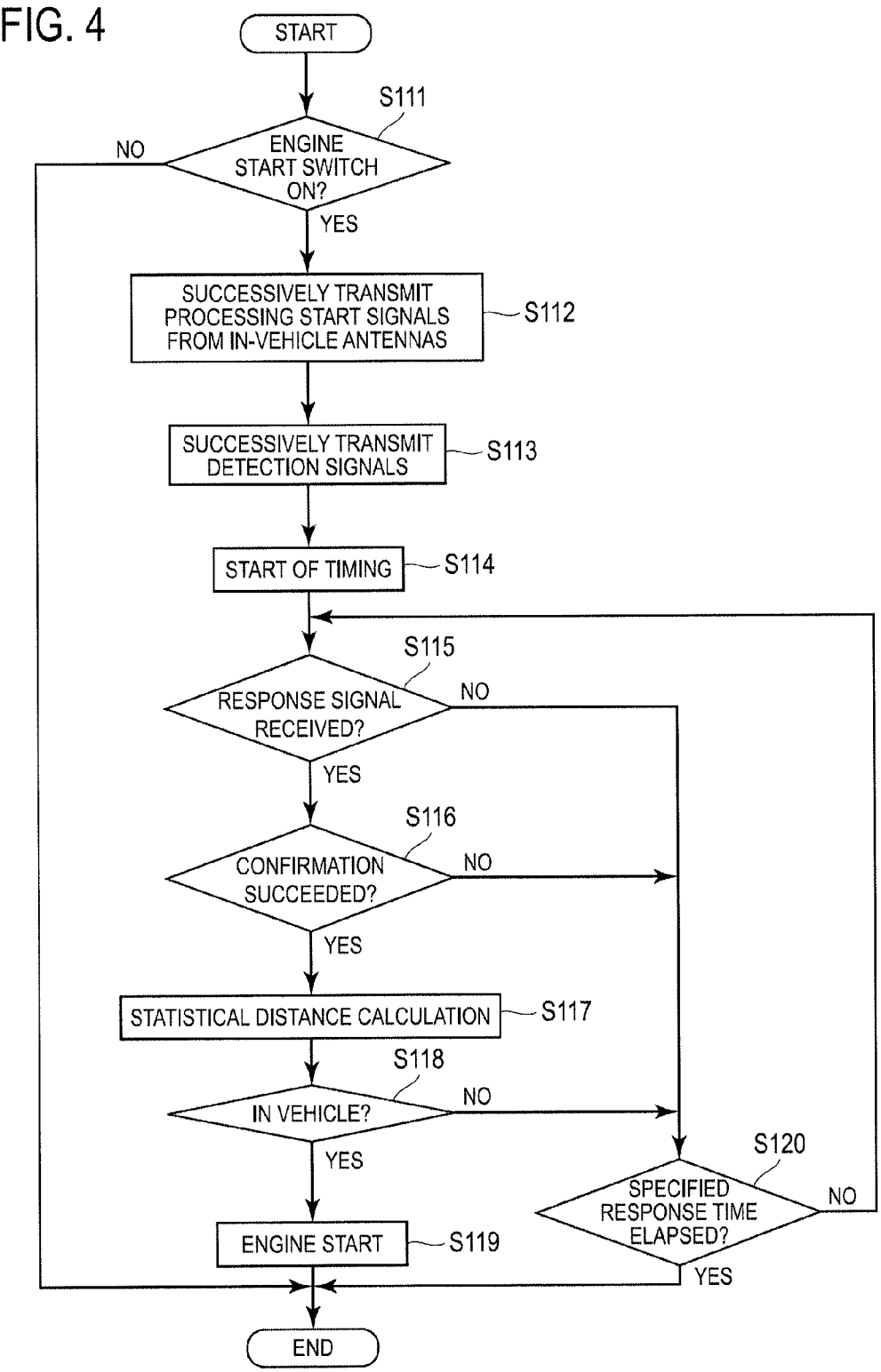
FIG. 4 is a flowchart showing a processing sequence of an on-board device, related to engine starting.
Figure 5:
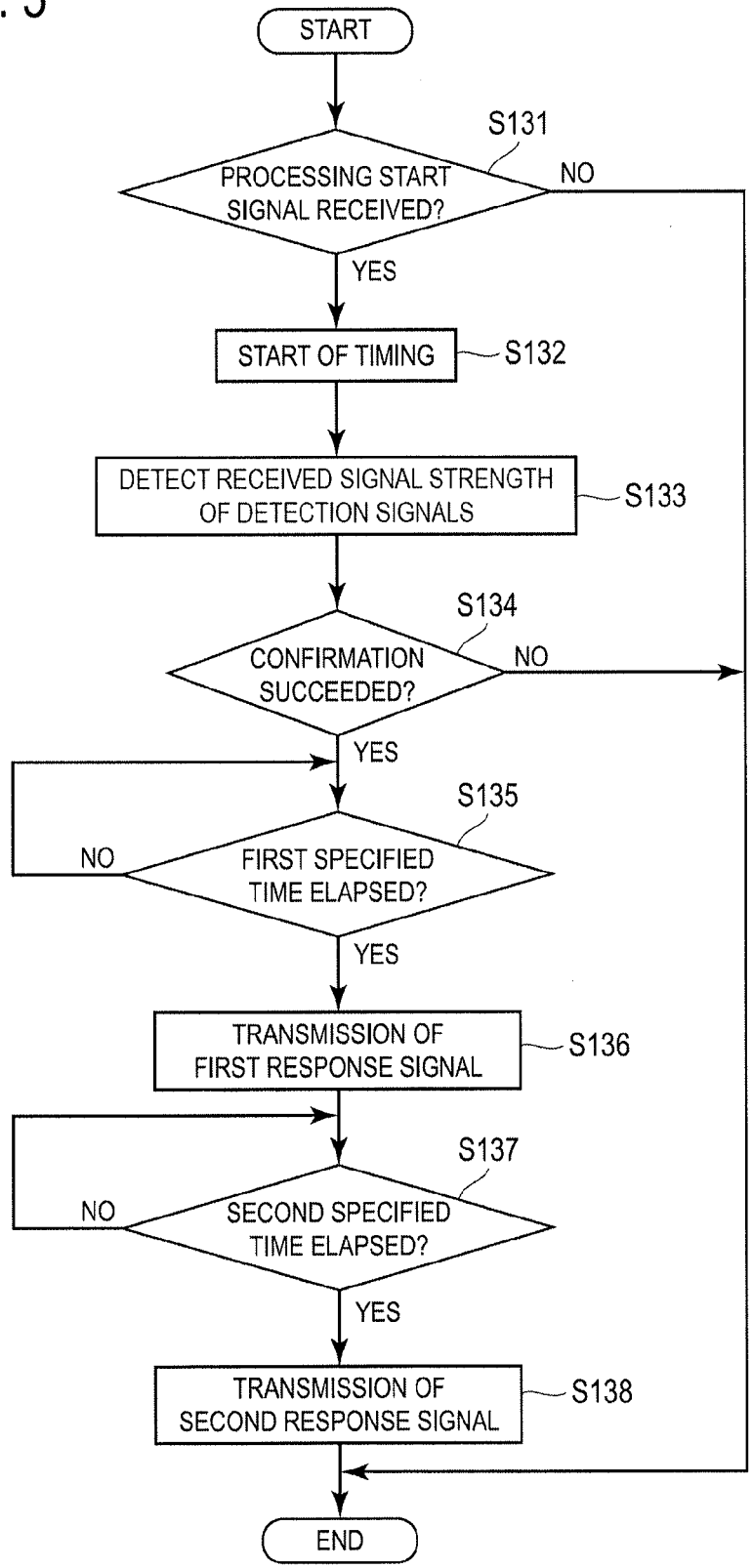
FIG. 5 is a flowchart showing a processing sequence at the time of engine starting.

FIG. 4 is a flowchart showing a processing sequence of an on-board device, related to engine starting. FIG. 5 is a flowchart showing a processing sequence at the time of engine starting. FIG. 6 is an explanatory diagram showing a first example of processing related to engine starting. Below, a process executed by the on-board control unit 10 of the on-board device 1, and a process executed by the portable control unit 31a of the portable device 3, will be described in sequence.

In FIG. 6A, "trigger" shows the operation state of the engine start switch 44. A high-level trigger signal corresponds to a state in which the engine start switch 44 is not depressed, and a low-level trigger signal corresponds to a state in which the engine start switch 44 is depressed. In particular, the "trigger" in FIG. 6A shows the operation state of the engine start switch 44. The on-board device 1 starts processing of the vehicle inside/outside determination at the time at which the trigger signal falls from the high level to the low level.

In FIG. 6A, "processing state" shows the driving state of the engine. The engine driving state is shown by the vertical height indicated by the bold line. The state in which the bold line is positioned at the top corresponds to the state in which the engine is stopped, and the state in which the bold line is positioned at the bottom corresponds to the state in which the engine is driven.

In FIG. 6A, "on-board device" is a timing chart showing the processing execution state of the on-board control unit 10 provided in the on-board device 1. The white rectangular portions indicate time periods in which the on-board control unit 10 executes some kind of processing. The on-board device 1 starts vehicle inside/outside determination processing with the fall of the trigger signal as the trigger, and gives to the on-board transmission unit 12 a command that causes transmission of various types of signals from the various LF transmission antennas 22.

In FIG. 6A, "driver's seat antenna", "passenger's seat antenna", "first in-vehicle antenna", "second in-vehicle antenna" and "back door antenna" are timing charts showing the timing at which signals are transmitted from the various LF transmission antennas 22. The rectangular portions with hatching downward to the left indicate the timing at which processing start signals are transmitted from the first in-vehicle antenna 22c and the second in-vehicle antenna 22d. In the example shown in FIG. 6A, the engine start switch 44 is depressed and processing start signals are transmitted from the first in-vehicle antenna 22c and the second in-vehicle antenna 22d. The processing start signals are signals for causing the start of processing for detecting the positions of the first through sixth portable devices 31, 32, . . . , 36.

In addition, the black rectangular portions indicate the timing at which detection signals for accomplishing a vehicle inside/outside determination of the portable device 3 are transmitted.

In FIG. 6A, "first portable device" to "sixth portable device" are timing charts indicating the timing at which the first portable device 31 through the sixth portable device 36 transmit response signals. The rectangular portions with hatching downward to the right indicate response signals transmitted from the first portable device 31 through the sixth portable device 36. In the example shown in FIG. 6A, only the first portable device 31 is present, and response signals are transmitted from the first portable device 31. The response signals are signals including information for detecting the positions of the portable devices 3.

The correlation between the various types of signals and the patterns of the rectangular portions of the timing charts in FIG. 6A described above are the same in other drawings showing timing charts.

The processing sequence of the on-board control unit 10 will be described with reference to FIG. 4. The on-board control unit 10 of the on-board device 1 monitors the operation state of the engine start switch 44, and determines whether or not engine, start switch 44 is in an on state (step S111). The on state is the state in which the engine start switch 44 is depressed, and the off state is the state in which the engine start switch 44 is not depressed.

In FIG. 6A, a high-level trigger signal indicated by "trigger" corresponds to the state in which the engine start switch 44 is not depressed, and a low-level trigger signal corresponds to the state in which the engine start switch 44 is depressed. The on-board control unit 10 can recognize the operation state of the engine start switch 44 based on the signal level of the trigger signal. When it is determined that the engine start switch 44 is in an off state (step S111: No), the on-board control unit 10 ends processing. When it is determined that the engine start switch 44 is in an on state (step S111: Yes), the on-board control unit 10 controls the operation of the on-board transmission unit 12 such that processing start signals are successively transmitted from the first in-vehicle antenna 22c and the second in-vehicle antenna 22d using LF-band radio waves (step S112). That is, first, a processing start signal is transmitted from the first in-vehicle antenna 22c, and next, a processing start signal is transmitted from the second in-vehicle antenna 22d.

Processing start signals are transmitted only from the first in-vehicle antenna 22c and the second in-vehicle antenna 22d. This is because (i) a requirement for confirmation that a portable device 3 is inside the vehicle is a requirement for engine starting, and even if there is a legitimate portable device 3, if it is outside the vehicle, engine starting will not be performed; and (ii) there is no need for operations that transmit processing start signals from the three out-of-vehicle antennas, that is, the driver's seat antenna 22a, the passenger's seat antenna 22b and the back door antenna 22e, which transmit the various types of signals primarily to portable devices 3 outside the vehicle, and activate portable devices 3 outside the vehicle.

Meanwhile, because the first in-vehicle antenna 22c and the second in-vehicle antenna 22d cover the entire signal transmission area inside the vehicle through two in-vehicle antennas, it is necessary to transmit the processing start signals from the two in-vehicle antennas, that is, from the first in-vehicle antenna 22c and the second in-vehicle antenna 22d.

Next, the on-board control unit 10, without waiting for a response from the portable device 3 and following transmission of the processing start signals, controls the operations of the on-board transmission unit 12 such that detection signals having a prescribed signal strength, for detecting the position of the portable device 3, are transmitted successively, using LF-band radio waves, from the back door antenna 22e, the driver's seat antenna 22a, the passenger's seat antenna 22b, the first in-vehicle antenna 22c, and the second in-vehicle antenna 22d, and at different timing for each of the plurality of LF transmission antennas 22 (step S113).

The processing operations of step S111 through step S113 will be described with reference to FIG. 6A. As shown in FIG. 6A, the on-board control unit 10 controls the operation of the on-board transmission unit 12 by executing the processing indicated in step S112 in response to pressing of the engine start switch 44. That is, the on-board control unit 10 starts the processing of the vehicle inside/outside determination with the fall of the trigger signal as a trigger, and gives a control command to the on-board transmission unit 12.

In FIG. 6A, the white rectangular portion shown in the "on-board device" timing chart indicates a portion of the primary processing of the vehicle inside/outside determination, that is, the timing at which the on-board control unit 10 executes the processing of step S112 and step S113.

The on-board transmission unit 12 performs transmission of the processing start signals and the detection signals from the transmission antennas 22, under control by the on-board control unit 10. In the embodiment shown in FIG. 6A, a case is shown in which the engine start switch 44 is operated. In this case, the on-board transmission unit 12 transmits processing start signals (the rectangular portions with hatching downward to the left) from the first in-vehicle antenna 22c and the second in-vehicle antenna 22d. The processing start signals are signals for causing processing for detecting the position of the portable device 3 to start. For example, the processing start signals include information for causing a portable device 3 in a sleep state to wake up, information necessary for confirmation of the on-board device 1 in the portable device 3, and the like. In addition, the processing start signals include information required for a vehicle inside/outside determination of the portable device 3. For example, the processing start signals include request information such as information for confirming the legitimacy of the on-board device 1 that is the transmission source of the processing start signals, and information necessary for performing the vehicle inside/outside determination of the portable device 3.

Next, the on-board transmission unit 12 transmits detection signals (the black-shaded rectangular portions) successively from the plurality of LF transmission antennas 22, at different timing for each of the plurality of LF transmission antennas 22. The detection signals are signals used in the vehicle inside/outside determination of the portable device 3. The timing of transmitting signals from each of the LF transmission antennas 22 is determined in advance. For example, the on-board device 1 makes the transmission time of the processing start signals a reference time and causes signals to be transmitted from each of the LF transmission antennas 22 at a predetermined timing that differs for each of the LF transmission antennas 22.

In this embodiment, one characteristic is that the LF transmission antennas 22 that sent the processing start signals (here, the first in-vehicle antenna 22c and the second in-vehicle antenna 22d ) transmit the detection signals last. When the processing start signal is transmitted from one LF transmission antenna 22 and immediately thereafter the detection signal is transmitted from the same LF transmission antenna 22, a burden is imposed on the LF transmission antenna 22. However, by having a structure such that when the processing start signal is transmitted from one LF transmission antenna 22, the detection signal is transmitted from other LF transmission antennas 22 and lastly the detection signal is transmitted from the one LF transmission antenna 22, it is possible to avoid the burden of signal transmission being concentrated on the one LF transmission antenna 22.

However, in the present invention, the order of the plurality of LF transmission antennas 22 transmitting the detection signal is not particularly limited as described above, and it is possible to set an arbitrary order.

Returning to FIG. 4, the processing sequence of the on-board control unit 10 will be described. The on-board control unit 10 that has finished the processing in step S113 starts timing a standby time waiting for a response from the portable device 3, that is, a timeout time, through the timer unit for on-board device 14 (step S114). The timing at which the timing is started by the timer unit for on-board device 14 is not particularly limited as long as it is possible to execute the timeout process. For example, timing may start from the point in time at which the engine start switch 44 is placed in an on state, or from the point in time at which transmission of the processing start signals starts or ends.

Next, the on-board control unit 10 determines whether or not the on-board reception unit 11 has received a response signal transmitted from any one of the portable devices 3 out of the first through sixth portable devices 31, 32, . . . , 36 (step S115). As described below, a portable device 3 that has received the processing start signals receives detection signals transmitted from each of the LF transmission antennas 22 and detects the received signal strengths of each of the detection signals received. The portable device 3 stores in advance the timing at which the detection signals are to be transmitted from each of the LF transmission antennas 22, and thus can identify the received signal strengths of the detection signals transmitted from each of the LF transmission antennas 22 by detecting the received signal strengths of the detection signals received by the reception antenna 31d at the prescribed timing.

Furthermore, the portable device 3 confirms the on-board device 1 that is the transmission source of the processing start signals, and when confirmation is successful, transmits to the on-board device 1 a response signal including information on the received signal strengths detected and information for confirming the portable device 3 on the on-board device 1 side. The response signal is transmitted twice from the portable device 3, as shown in FIG. 6A. The rectangular portions with hatching downward to the right indicate response signals transmitted from the portable device 3. In the example shown in FIG. 6A, a case is shown in which response signals are transmitted from the first portable device alone. The response signal transmitted the first time is the first response signal, and the response signal transmitted the second time is the second response signal.

In addition, the response signals in some cases are transmitted from all of the first through sixth portable devices 31, 32, . . . , 36, and in some cases are transmitted from a part of the portable devices 3 out of the first through sixth portable devices 31, 32, . . . , 36, depending on the position at which the first through sixth portable devices 31, 32, . . . , 36 exist. However, because each of the portable devices 3 transmits response signals using radio waves in the same frequency band, when response signals are simultaneously transmitted from two or more of the portable devices 3, there are cases in which the on-board device 1 cannot receive the response signals normally. Accordingly, in step S115, the on-board control unit 10 determines whether or not response signals transmitted from the portable devices 3 were received normally.

When it is determined that a response signal transmitted from a portable device 3 was received (step S115: Yes), the on-board control unit 10 confirms the portable device 3 based on the information contained in the response signal and determines whether or not confirmation was successful (step S116). When it is determined that confirmation was successful (step S116: Yes), the on-board control unit 10 calculates the statistical distance between (i) the portable device 3 that is the transmission source of the response signal and (ii) the inside of the vehicle and the outside of the vehicle, based on the information on the received signal strengths included in the response signal received (step S117).

The received signal strengths included in the response signal are a vector. The components of the vector are the respective received signal strengths of the plurality of detection signals transmitted from each of the LF transmission antennas 22. In this embodiment, the vector is five-dimensional, because the vector has as components the received signal strengths respectively corresponding to the plurality of detection signals transmitted from the five LF transmission antennas 22. The storage unit for on-board device 13 of the on-board device 1 stores, for example, the statistical value of the average vector, a variance matrix or an inverse variance matrix of the received signal strengths found on the basis of a sample group of the received signal strengths detected by the portable device 3 at a plurality of locations inside the vehicle. The on-board control unit 10 calculates the statistical distance between (i) the sample group of received signal strengths detected by the portable device 3 that is inside the vehicle and (ii) the vector of the received signal strengths included in the response signal received in step S115. In other words, a value corresponding to the degree of similarity between (i) the received signal strengths included in the response signal received in step S115 and (ii) the received signal strengths detected by a portable device 3 disposed inside the vehicle is calculated. The statistical distance is, for example, a Mahalanobis distance, but is not particularly limited.

Similarly, the storage unit for on-board device 13 of the on-board device 1 stores the statistical values of the average vector, a variance matrix or an inverse variance matrix of the received signal strengths found on the basis of a sample group of the received signal strengths detected by the portable device 3 at a plurality of locations outside the vehicle. The on-board control unit 10 calculates the statistical distance between (i) the sample group of received signal strengths detected by a portable device 3 that is outside the vehicle and (ii) the vector of the received signal strengths included in the response signal received in step S115.

The on-board control unit 10 that has finished the processing of step S117 determines whether or not the portable device 3 that is the transmission source of the response signal received in step S115 is inside the vehicle, based on the statistical distance calculated in step S117 (step S118). That is, the on-board control unit 10 identifies the position of the portable device 3 through the processing of step S117 and step S118. The on-board control unit 10 determines that the portable device 3 is inside the vehicle if the statistical distance between the received signal strengths included in the response signal and the sample group of received signal strengths detected by a portable device 3 that is inside the vehicle is shorter than the statistical distance between the received signal strengths and the sample group of received signal strengths detected by a portable device 3 that is outside the vehicle. When it is determined that the portable device 3 is inside the vehicle (step S 118: Yes), the on-board control unit 10 executes processing to start the engine (step S 119) and ends processing. More specifically, the on-board control unit 10 of the on-board device 1 executes processing to transmit to an undepicted engine ECU a signal ordering engine starting.

In this embodiment, when it is determined that even one of the portable devices 3 is inside the vehicle, the on-board control unit 10 executes processing to start the engine, without waiting for response signals from the other portable devices 3.

When it is determined in step S115 that a response signal has not been received (step S115: No), when it is determined in step S116 that confirmation has failed (step S116: No), or when it is determined in step S118 that a portable device 3 is not inside the vehicle (step S118: No), the on-board control unit 10 determines whether or not a prescribed response time has elapsed since timing by the timer unit for on-board device 14 started (step S120). When the prescribed response time has not elapsed (step S120: No), the on-board control unit 10 returns processing to step S115 and executes the steps beginning with receiving response signals from the other portable devices 3 and continuing through the vehicle inside/outside determination. When it is determined that the prescribed response time has elapsed (step S120: Yes), the on-board control unit 10 ends processing.

The method of the vehicle inside/outside determination for portable devices 3 described above is one example, and it is possible to apply to the present invention an arbitrary method that enables accomplishment of a vehicle inside/outside determination for portable devices 3 on the basis of detection signals from the plurality of LF transmission antennas 22.

Next, processing by the portable devices 3 is described with reference to FIG. 5. Processing by the first through sixth portable devices 31, 32, . . ., 36 differs only in the transmission timing of response signals, so here, processing by the first portable device 31 is described. The portable control unit 31a of the portable device 3 monitors signals received by the portable reception unit 31b, and determines whether or not a processing start signal transmitted from the on-board device 1 has been received by the portable reception unit 31b(step S131). When it is determined that a processing start signal has not been received (step S131: No), the portable control unit 31a ends processing. When it is determined that a processing start signal has been received (step S131: Yes), the portable control unit 31a starts timing by the timer unit for portable device 31h (step S132).

Next, the portable control unit 31a detects, in the received signal strength detection unit 31c, the received signal strengths of the detection signals transmitted from each of the LF transmission antennas 22 of the on-board device 1 (step S133). The timing at which the detection signals are transmitted from each of the LF transmission antennas 22 is predetermined. Accordingly, the portable control unit 31a can detect the received signal strengths of the detection signals transmitted from each of the LF transmission antennas 22, by acquiring the received signal strengths detected by the received signal strength detection unit 31c at the specific timing timed by the timer unit for portable device 31h. Furthermore, the portable control unit 31a confirms whether or not the transmission source of the processing start signals is a legitimate on-board device 1, on the basis of information included in the processing start signal received earlier, and determines whether or not confirmation was successful (step S134). When it is determined that confirmation failed (step S134: No), the portable control unit 31a ends processing.

When it is determined that confirmation was successful (step S134; Yes), the portable control unit 31a determines whether or not a first prescribed time has elapsed from when the processing start signal was received (step S135). The first prescribed time is common among the first through sixth portable devices 31, 32, . . . , 36. When it is determined that the first prescribed time has not elapsed (step S135: No), the portable control unit 31a again executes the processing of step S135, and waits until the first prescribed time has elapsed. When it is determined that the first prescribed time has elapsed (step S135: Yes), the portable control unit 31a causes the portable transmission unit 31e to transmit the first response signal (step S136). The portable transmission unit 31e transmits the first response signal from the RF transmission antenna 31f using UHF-band radio waves. The first response signal includes information about the received signal strengths detected in step S133, and information for confirming, on the on-board device 1 side, the legitimacy of the portable device 3 that is the transmission source of the information.

The other portable devices 3 besides the first portable device 31 also transmit the first response signal when roughly the same first prescribed time has elapsed. Accordingly, in a case such as when the user holds a plurality of portable devices 3, the first response signal is transmitted from the plurality of portable devices 3 at the same timing. Consequently, there are cases in which the on-board device 1 fails to receive the first response signal (see FIG. 8A). Hence, the portable control unit 31a executes the following processing.

The portable control unit 31a determines whether or not a second prescribed time has elapsed from when the processing start signal was received (step S137). The second prescribed time differs for each of the first through sixth portable devices 31, 32, . . . , 36. In this embodiment, the description will assume that the second prescribed time becomes longer in the order of the first portable device 31, the second portable device 32, the third portable device 33, the fourth portable device 34, the fifth portable device 35 and the sixth portable device 36. The second prescribed time for each of the portable devices 3 is set such that the interval during which transmission and reception of the second response signal is accomplished between one of the portable devices 3 and the on-board device 1 does not overlap with the interval during which transmission and reception of the second response signal is accomplished between another of the portable devices 3 and the on-board device 1, and such that the sixth portable unit 36 can transmit the second response signal to the on-board device 1 as early as possible. When it is determined that the second prescribed time has not elapsed (step S137: No), the portable control unit 31a again executes the processing of step S137 and waits until the second prescribed time has elapsed. When it is determined that the second prescribed time has elapsed (step S137: Yes), the portable control unit 31a causes the portable transmission unit 31e to transmit the second response signal (step S138) and ends processing. The second response signal, like the first response signal, includes information about the received signal strengths detected in step S133, and information for confirming the legitimacy of the portable device 3 that is the transmission source of the information.

The first response signal and the second response signal may contain substantially the same information relating to the received signal strengths, or the first and second response signals may include information that partially differs.

Figure 11:
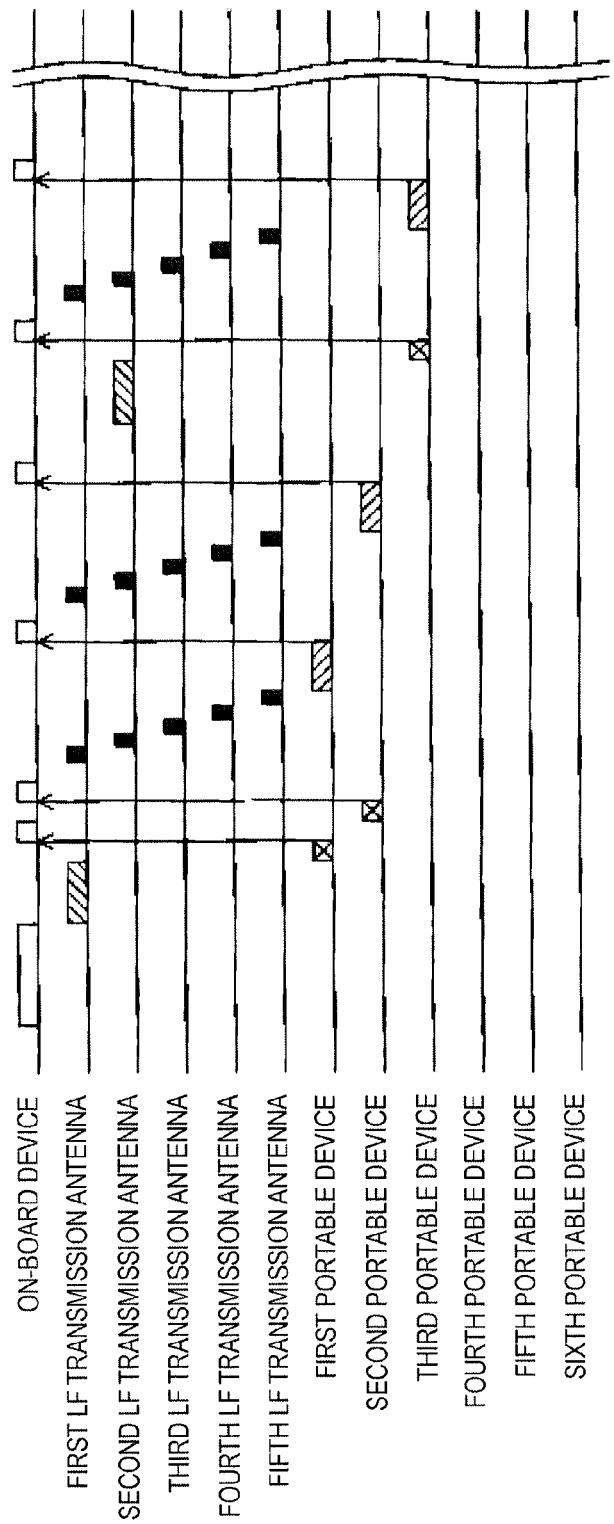
FIG. 11 is a timing chart showing signals transmitted and received in position detection processing of a portable device in conventional technology.

When the portable device 3 structured in this manner has received a processing start signal, the received signal strengths of the detection signals transmitted from each of the LF transmission antennas 22 are detected, the first response signals are transmitted at a common timing for each of the portable devices 3, and the second response signals are transmitted at different timing for each of the portable devices 3 (see FIG. 11A).

In the example described with reference to FIG. 4 and FIG. 5, an example was described in which the on-board control unit 10 executes a statistical distance calculation and a vehicle inside/outside determination for the portable devices 3, but the structure may be such that the primary processing of the statistical distance calculation and the vehicle inside/outside determination is executed by the portable device 3 and a response signal including the results of the vehicle inside/outside determination is transmitted to the on-board device 1. Specifically, as information for the vehicle inside/outside determination, the storage unit for portable device 31g stores (i) the statistical values of an average vector, a variance matrix or an inverse variance matrix, or the like of the received signal strengths found based on the sample group of received signal strengths detected by the portable device 3 at a plurality of locations inside the vehicle, and (ii) the statistical values of an average vector, a variance matrix or an inverse variance matrix, or the like of the received signal strengths found based on the sample group of received signal strengths detected by the portable device 3 at a plurality of locations outside the vehicle. The portable control unit 31a executes the same processing as in step S117 and step S118 after the received signal strengths of the detection signals transmitted from each of the LF transmission antennas 22 in step S133 are detected by the received signal strength detection unit 31c. That is, the portable control unit 31a calculates the statistical distances between (i) the inside of the vehicle and the outside of the vehicle and (ii) the portable device 3 itself, on the basis of the information about the received signal strengths. Furthermore, the portable control unit 31a determines whether or not the unit itself is outside the vehicle, on the basis of the calculated statistical distances. That is, the portable control unit 31a determines its own position. The portable control unit 31a determines that the unit itself is outside the vehicle if the statistical distance between (i) the detected received signal strengths and (ii) the sample group of received signal strengths detected by a portable device 3 outside the vehicle is shorter than the statistical distance between (i) the detected received signal strengths and (ii) the sample group of received signal strengths detected by a portable device 3 inside the vehicle. Similarly, the portable control unit 31a determines that the unit itself is inside the vehicle when the statistical distance between (i) the detected received signal strengths and (ii) the sample group of received signal strengths detected by a portable device 3 inside the vehicle is short compared to the statistical distance between (i) the detected received signal strengths and (ii) the sample group of received signal strengths detected by a portable device 3 outside the vehicle. Below, the portable control unit 31a transmits the first response signal and the second response signal including the results of the vehicle inside/outside determination to the on-board device 1, through the portable transmission unit 31e, by executing the same processing as in step S134 through step S138 of FIG. 5.

The on-board control unit 10 receives the response signals transmitted from the portable device 3 via the on-board reception unit 11 (step S115: Yes), confirms the portable device 3 on the basis of the information included in the response signals, and determines whether or not confirmation was successful (step S116). When it is determined that confirmation was successful (step S116: Yes), the on-board control unit 10 determines whether or not the portable device 3 is inside the vehicle, on the basis of the results of the vehicle inside/outside determination included in the response signals (step S118). In the structure in which the portable device 3 accomplishes the vehicle inside/outside determination, the on-board control unit 10 does not execute the processing of step S117. When it is determined that the portable device 3 is inside the vehicle (step S118: Yes), the on-board control unit 10 executes processing to start the engine (step S119), and ends processing.

When it is determined in step S115 that a response signal has not been received (step S115: No), when it is determined in step S116 that confirmation has failed (step S116: No), or when it is determined in step S118 that the portable device 3 is not inside the vehicle (step S118: No), the on-board control unit 10 determines whether or not the prescribed response time has elapsed from when timing was started by the timer unit for on-board device 14 (step S120). When the prescribed response time has not elapsed (step S120: No), the on-board control unit 10 returns processing to step S115 and executes the steps beginning with receiving response signals from the other portable devices 3 and continuing through the vehicle inside/outside determination. When it is determined that the prescribed response time has elapsed (step S120: Yes), the on-board control unit 10 ends processing.

Next, operation of an on-board communication system structured as described above will be explained.

FIRST EXAMPLE

As shown in FIG. 6B, the first example is a case in which the first portable device 31 is inside the vehicle. When a user depresses the engine start switch 44, as shown in FIG. 6A, the on-board device 1 transmits processing start signals from the first in-vehicle antenna 22c and the second in-vehicle 22d, and then successively transmits detection signals for the vehicle inside/outside determination from each LF transmission antenna 22, at a different timing for each of the plurality of LF transmission antennas 22. Because the structure is such that the portable device 3 is activated by successively transmitting processing start signals from a plurality of LF transmission antennas 22 at different timings, the portable device 3 can be quickly activated, and position detection of the portable device 3 can be quickly performed, compared to a structure in which activation and position detection of the portable device 3 are performed for each of a plurality of LF transmission antennas.

Because a user is holding the first portable device 31, the first portable device 31 receives the processing start signals, measures the received signal strengths of the detection signals transmitted from each LF transmission antenna 22, and transmits to the on-board device 1, in order, (i) a first response signal that has information of the measured received signal strengths and (ii) a second response signal. Because only the first portable device 31 exists inside or near the outside of the vehicle, the on-board device 1 can receive the first response signal transmitted from the first portable device 31. Therefore, the on-board device 1 can perform vehicle inside/outside determination of the first portable device 31, based on the first response signal transmitted from the first portable device 31. In the first example, because the first portable device 31 is inside the vehicle, the on-board control unit 10 of the on-board device 1 can perform processing to start the engine based on the first response signal that is first transmitted from the first portable device 31.

SECOND EXAMPLE

Figure 7A:
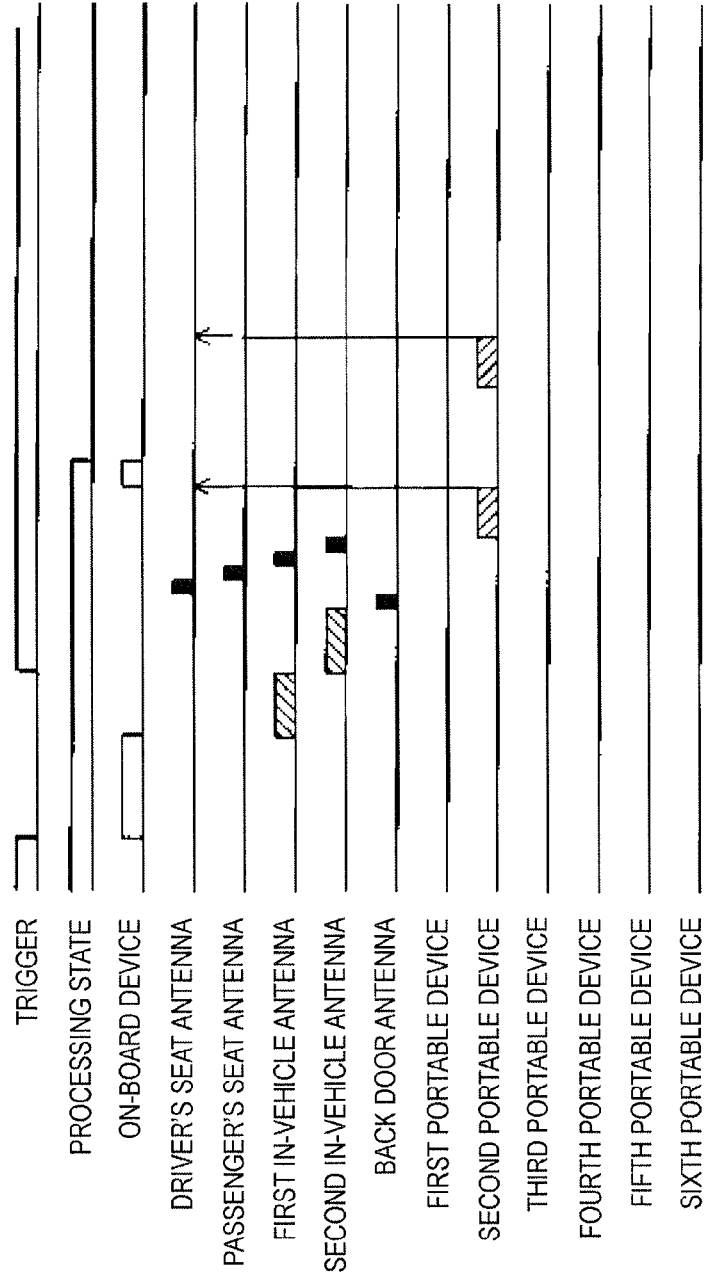
FIG. 7 is an explanatory diagram showing a second example of processing related to engine starting.
Figure 7B:
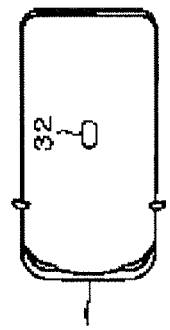

FIG. 7 is an explanatory diagram showing a second example of processing related to engine starting. As shown in FIG. 7B, this is a case in which the second portable device 32 is inside the vehicle. The sending and receiving sequence of the processing start signals and the detection signals for inside vehicle/outside vehicle determination are the same as in the first example. However, the second portable device 32 sends the first response signal and the second response signal to the on-board device 1 in order, but the transmission timing of the second response signal is delayed more than that of the first portable device 31. However, because only the second portable device 32 exists inside or near the outside of the vehicle, the on-board device 1 can receive the first response signal transmitted from the second portable device 32. Therefore, the on-board device 1 can perform vehicle inside/outside determination of the second portable device 32, and can perform processing to start the engine, based on the first response signal transmitted from the second portable device 32. That is, the on-board device 1 can perform processing to start the engine based on the first-transmitted first response signal, without waiting for the second response signal transmitted from the second portable device 32. Because the timing at which the first response signal is transmitted is the same as that in the first portable device 31, even if the user is holding the second portable device 32, the on-board device 1 can start the engine with the same processing time as when the user is holding the first processing device 31. It is the same for the cases in which the third portable device 33, the fourth portable device 34, the fifth portable device 35, and the sixth portable device 36 are used, and the on-board device 1 can quickly start the engine.

THIRD EXAMPLE

Figure 8A:
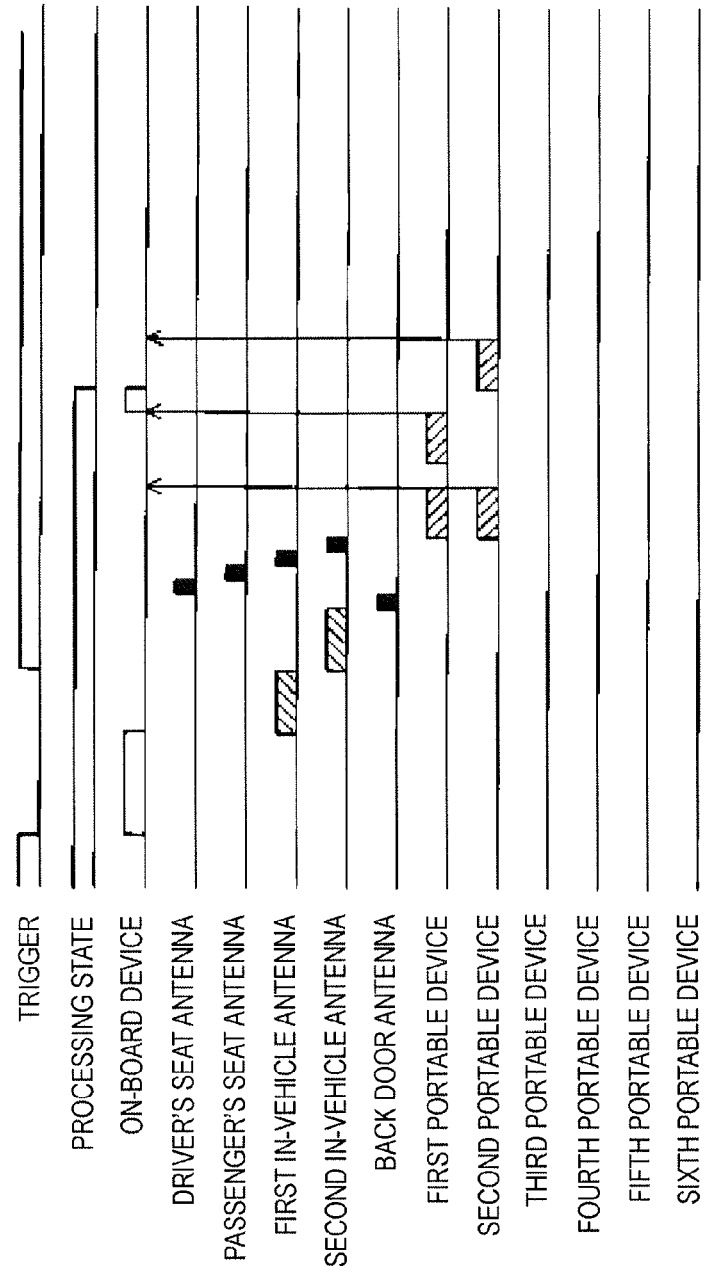
FIG. 8 is an explanatory diagram showing a third example of processing related to engine starting.
Figure 8B:
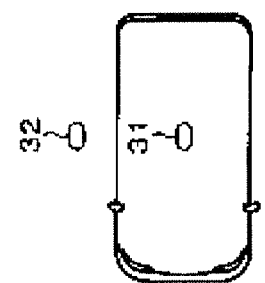

FIG. 8 is an explanatory diagram showing a third example of processing related to engine starting. As shown in FIG. 8B, the third example is a case in which the first portable device 31 is inside the vehicle, and the second portable device 32 is outside the vehicle. The sending and receiving sequence of the processing start signals and the detection signals for inside vehicle/outside vehicle determination are the same as in the first example. However, as shown in FIG. 8A, the first portable device 31 and the second portable device 32 transmit first response signals at the same timing. Then, after transmission of the first response signal, the first portable device 31 transmits a second response signal, and after transmission and reception of the second response signal have been performed between the first portable device 31 and the on-board device 1, the second portable device 32 transmits a second response signal. In the third example, because both the first portable device 31 and the second portable device 32 exist inside or near the outside of the vehicle, and the first response signals are transmitted from the first portable device 31 and the second portable device 32 at the same timing, there are cases in which the on-board device 1 fails to receive the first response signals.

However, the on-board device 1 can receive the second response signal transmitted from the first portable device 31. Therefore, the on-board device 1 can perform vehicle inside/outside determination of the first portable device 31 based on the second response signal transmitted from the first portable device 31. In the third example, because the first portable device 31 is inside the vehicle, processing to start the engine is performed. That is, without waiting for the second response signal transmitted from the second portable device 32, the on-board device 1 can perform processing to start the engine based on the second response signal transmitted earlier from the first portable device 31.

FOURTH EXAMPLE

FIG. 9 is an explanatory diagram showing a fourth example of processing related to engine starting. As shown in FIG. 9B, the fourth example is a case in which the first portable device 31 is outside the vehicle and the sixth portable device 36 is inside the vehicle. The sending and receiving sequence of the processing start signals and the detection signals for inside vehicle/outside vehicle determination is the same as in the third example. In the fourth example, because both the first portable device 31 and the sixth portable device 36 exist inside or near the outside of the vehicle, and the first response signals are transmitted from the first portable device 31 and the sixth portable device 36 at the same timing as shown in FIG. 9A, there are cases in which the on-board device 1 fails to receive the first response signals. However, the on-board device 1 can receive the second response signal transmitted from the first portable device 31, and perform vehicle inside/outside determination of the first portable device 31 based on that second response signal. In the fourth example, because the first portable device 31 is outside the vehicle, processing to start the engine is not performed. Next, the on-board device 1 can receive the second response signal transmitted from the sixth portable device 36, and perform vehicle inside/outside determination of the sixth portable device 36 based on that second response signal. Because the sixth portable device 36 is inside the vehicle, the on-board device 1 can perform processing to start the engine based on the second response signal from the sixth portable device 36. In the fourth example, the processing is slower than that in the third example, but processing to start the engine can be performed, at the latest, based on the second response signal from the sixth portable device 36. The fourth example is an example in which the engine start processing in this embodiment is the slowest, but because the structure is such that processing start signals and detection signals for vehicle inside/outside determination are successively transmitted to each portable device 3, at different timings for each of a plurality of LF transmission antennas 22, the vehicle inside/outside determinations can be performed and the engine start processing can be executed more efficiently than in conventional on-board communication systems.

FIFTH EXAMPLE

FIG. 10 is an explanatory diagram showing a fifth example of processing related to engine starting. As shown in FIG. 10B, the fifth example is a case in which the first through fifth portable devices 31, 32, . . . , 35 are outside the vehicle and the sixth portable device 36 is inside the vehicle. The sending and receiving sequence of the processing start signals and the detection signals for inside vehicle/outside vehicle determination is the same as in the fourth example. In the fifth example, because the first through sixth portable devices 31, 32, . . . , 36 exist inside or near the outside of the vehicle, and the first response signals are transmitted from the first through sixth portable devices 31, 32, . . . , 36 at the same timing as shown in FIG. 10A, there are cases in which the on-board device 1 fails to receive the first response signals. However, the on-board device 1 can receive the second response signal transmitted from the first portable device 31, and can perform vehicle inside/outside determination of the first portable device 31 based on that second response signal. In the fifth example, because the first portable device 31 is outside the vehicle, processing to start the engine is not performed. In the same manner, vehicle inside/outside determination is also performed for the second through fifth portable devices 32, 33, 34, 35, but because they are all outside the vehicle, processing to start the engine is not performed. Lastly, the on-board device 1 receives the second response signal transmitted from the sixth portable device 36, and performs vehicle inside/outside determination of the sixth portable device 36 based on that received second response signal. Because the sixth portable device 36 is inside the vehicle, the on-board device 1 can perform processing to start the engine based on the second response signal from the sixth portable device. The fifth example is a case in which the sixth portable device 36, for which the timing of transmitting the second response signal is the slowest, is inside the vehicle, but processing to start the engine can be performed, at the latest, based on the second response signal from the sixth portable device 36. Like the fourth example, the fifth example is an example in which the engine start processing is the slowest, but because the structure is such that processing start signals and detection signals for vehicle inside/outside determination are successively transmitted to each portable device 3, at different timings for each of a plurality of LF transmission antennas 22, the vehicle inside/outside determinations can be performed and the engine start processing can be executed more efficiently than in conventional on-board communication systems.

According to the on-board communication system, the on-board device 1, and the portable devices 3 of this embodiment, the time required for position detection of the portable devices 3 can be shortened. Specifically, because the on-board device 1 successively transmits processing start signals to the portable devices 3 from a plurality of LF transmission antennas 22, at different timings for each of the plurality of LF transmission antennas 22, the portable devices 3 can be more quickly activated, and the processing of the detection signals and the position detection of the portable devices 3 can be more quickly performed, than in a case in which processing start signals are transmitted and position detection of the portable devices 3 is performed for each of the LF transmission antennas 22.

For example, even in a case in which a user habitually puts a portable device 3 in a handbag and places it in the rear seat of the vehicle, position detection of the portable device 3 and engine start processing can be quickly performed, without always having a delay in the engine start timing as in the conventional technology. Additionally, even in case in which a user habitually carries a portable device 3 on his or her person, position detection of the portable device 3 and engine start processing can be quickly performed, without always having a delay in the engine start timing.

That is, even if a user who places a portable device 3 in the rear part of the inside of a vehicle and a user who places a portable device 3 in the front part of the inside of the vehicle both use the on-board communication system of this embodiment, in either case, the average processing speed of the position detection of the portable devices 3 and the engine start processing can be shortened, without always having a delay in the engine start timing.

Additionally, in the position detection processing of the portable devices 3 related to engine starting, because processing start signals are transmitted from the first in-vehicle antenna 22c and the second in-vehicle antenna 22d among the plurality of LF transmission antennas 22, and processing start signals are not transmitted from the other LF transmission antennas 22, the responsiveness of the on-board communication system can be better improved.

Additionally, after the processing start signals, because the on-board device 1 successively transmits detection signals to the portable devices 3 from a plurality of LF transmission antennas 22, at different timings for each of the plurality of LF transmission antennas 22, the position detection of the portable devices 3 can be performed more quickly than in the case in which detection signals are sent separately for each portable device 3.

Additionally, because the structure is such that the on-board device 1 detects the positions of the portable devices 3 by transmitting, to each portable device 3, processing start signals and detection signals that all of the plurality of portable devices 3 can receive in common, the time required for information communication between the on-board device 1 and the portable devices 3 can be shortened, and position detection of the portable devices 3 can be efficiently performed, compared to the case in which communications are separately performed for each portable device 3.

Furthermore, after transmission of the processing start signals, the on-board device 1 transmits the detection signals without waiting for a response from the portable devices 3 that have received the processing start signals. Therefore, the time required for information communication between the on-board device 1 and the portable devices 3 can be further shortened, and position detection of the portable devices 3 can be efficiently performed.

Furthermore, in cases such as when one portable device 3 is present inside the vehicle or near the vehicle C, vehicle inside/outside determination can be performed to the portable device 3, and motor starting processing can be executed, through the earlier-transmitted first response signal.

Even in cases in which a plurality of portable devices 3 is present inside the vehicle or near the vehicle C, motor starting processing can be executed based on the second response signal transmitted from each portable device 3.

According to this embodiment, because the structure is such that each portable device 3 transmits a first response signal and a second response signal at a different timing with reference to a point in time at which processing start signals transmitted from the on-board device 1 are received, simultaneous transmission of the second response signals transmitted for each portable device can be reliably prevented. Therefore, even if the on-board device 1 fails to receive the first response signal transmitted from each portable device 3, the second response signals can be reliably received, and motor starting processing can be performed.

In this embodiment, the structure is such that a plurality of portable devices 3 simultaneously transmits first response signals at matching timing, and then transmit second response signals at different timings for each of the plurality of portable devices 3. Therefore, even if the transmission timings of the first response signals and second response signals are made to be close, there is no worry of the first response signal and the second response signal being mixed. Because of this, it is possible to make the design such that a plurality of portable devices 3 can complete transmission of the first response signals and the second response signals in the shortest time possible, and the on-board device 1 can receive the first response signal or the second response signal at an early time.

Furthermore, in this embodiment, the portable devices 3 detect the received signal strengths of detection signals transmitted from each LF transmission antenna 22, and transmit the first response signals and the second response signals that include the detected received signal strengths, and the on-board device 1 can identify the positions of the portable devices 3 based on the received signal strengths included in the received response signals. The positions of the portable devices 3 can be accurately identified by using the received signal strengths of the detection signals from the plurality of LF transmission antennas.

Furthermore, in a structure in which the vehicle position detection is performed on the portable device 3 side, a portable device 3 detects the received signal strengths of detection signals transmitted from each LF transmission antenna 22, and identifies its own position based on the detected received signal strengths Then, the portable device 3 transmits its own position that has been identified to the on-board device 1, and the on-board device can perform vehicle inside/outside determination of the portable device 3 based on information included in the received response signals. By using the received signals strengths of the detection signals from the plurality of LF transmission antennas, the positions of the portable devices 3 can be accurately identified.

In this embodiment, an example was described in which the on-board device 1 performs the vehicle inside/outside determination of the portable devices 3, but a structure is also acceptable in which a portable device 3 performs its own vehicle inside/outside determination, and transmits to the on-board device 1 a first response signal and a second response signal that include the result of the vehicle inside/outside determination, as information corresponding to the detection signals transmitted from the LF transmission antennas 22.

In this embodiment, processing at the time of engine starting was described, but the processing of this embodiment can be applied to processing that confirms that a portable device 3 is present inside the vehicle during engine operation.

Additionally, this invention can apply not only to engine start processing, but also to vehicle door locking processing or unlocking processing. In this case, the vehicle inside/outside determination of the portable devices 3 is performed by (i) successively transmitting processing start signals from the driver's seat antenna 22a, the passenger's seat antenna 22b, and the back door antenna 22e, respectively; (ii) transmitting detection signals from all of the LF transmission antennas 22 without waiting for a response from the portable devices 3; and (iii) receiving response signals from the portable devices 3. By performing this type of processing, the time required for information communication between the on-board device 1 and the portable devices 3 in the position detection of the portable devices 3 can be shortened, and position detection of the portable devices 3 can be efficiently performed.

Furthermore, the technologies to which this invention is applicable are of course not limited to these technologies, and the LF transmission antennas that should be used are not limited to all of the antennas or to two of the antennas.

Furthermore, in the above-described embodiment, an example was described in which the timing at which a portable device 3 transmits a first response signal and a second response signal is measured using processing start signals transmitted from the LF transmission antennas 22 as a trigger, but the method of timing measurement is not limited to this. The processing start signals are one example of a timing start signal for starting time measurement by the timer unit for portable device 31h in order to device the timing at which the portable device transmits the first response signal and the second response signal. That is, in this embodiment, the processing start signals are used in common as timing start signals.

The on-board controller 10 may control the operation of the on-board transmission unit 12 such that timing start signals are transmitted as signals different from the processing start signals. For example, the structure may be such that the on-board device 1 transmits processing start signals, and then transmits timing start signals. Additionally, if the processing start signals and the timing start signals are transmitted as separate signals, the on-board device 1 may transmit the processing start signals and the timing start signals from the same LF transmission antennas 22. Because the processing start signals are transmitted from the LF transmissions antennas, from which it is easy for the portable devices 3 to receive the processing start signals, the portable devices 3 can be enabled to reliably receive the timing start signals by also transmitting the timing start signals from the same LF transmission antennas 22.

In the processing of step S132, the portable control unit 31a uses the point in time at which the processing start signals are received as the timing of the start of time measurement by the timer unit for portable device 31h. However, if the structure is such that, as described above, timing start signals are transmitted from the on-board device 1 separately from the processing start signals, the point in time at which the timing start signals are received can be used as the timing of the start of time measurement. Specifically, the structure may be such that the portable control unit 31a monitors the signals received by the portable reception unit 31b, and if it is determined that the portable reception unit 31b has received the timing start signals, the time measurement by the timer unit for portable device 31h starts.

Additionally, the structure may be such the portable control unit 31a monitors the signals received by the portable reception unit 31b, and if it is determined that the portable reception unit 31b has received detection signals, the time measurement by the timer unit for portable device 31h starts. In this case, it is preferable for detection signals transmitted from LF transmission antennas 22 that are the same LF transmission antennas 22 that transmitted the processing start signals to be caused to function as the timing start signals. If detection signals transmitted from LF transmission antennas 22 that are different from the LF transmission antennas 22 that transmitted the processing start signals are used as the timing start signals, there is a possibility that a portable device 3 that has received the processing start signals will not be able to receive the detection signals that function as the timing start signals. If the detection signals cannot be received, the portable device 3 cannot start time measurement. Because the processing start signals are transmitted from the LF transmission antennas 22, from which it basically is easy for the portable devices 3 to receive the processing start signals, by causing detection signals transmitted from LF transmission antennas 22 that are the same LF transmission antennas 22 that transmitted the processing start signals to function as the timing start signals, the possibility that a portable device 3 that has received the processing start signals can also receive the detection signals that function as the timing start signals can be increased.

In this embodiment, the structure is such that processing start signals are transmitted from both the first in-vehicle antenna 22c and the second in-vehicle antenna 22d, but it is also acceptable for a portable device 3 to cause a single processing start signal or detection signal transmitted from either of the in-vehicle antennas, that is, from the first in-vehicle antenna 22c or the second in-vehicle antenna 22d, to function as a timing start signal.

That is, if a processing start signal is caused to function as a timing start signal, it is acceptable to cause a processing start signal transmitted from the first in-vehicle antenna 22c to function as the timing start signal, and it is also acceptable to cause a processing start signal transmitted from the second in-vehicle antenna 22d to function as the timing start signal. Similarly, if a detection signal is caused to function as a timing start signal, it is acceptable to cause a detection signal transmitted from the first in-vehicle antenna 22c to function as the timing start signal, and it is also acceptable to cause a detection signal transmitted from the second in-vehicle antenna 22d to function as the timing start signal.

For example, there is a case in which one portable device 3 can only receive the processing start signal and the detection signal transmitted from the first in-vehicle antenna 22c, and another portable device 3 can only receive the processing start signal and the detection signal transmitted from the second in-vehicle antenna 22d. In this case, one portable device 3 uses the processing start signal or detection signal transmitted from the first in-vehicle antenna 22c as a timing start signal, and another portable device 3 uses the processing start signal or detection signal transmitted from the second in-vehicle antenna 22d as a timing start signal.

Because the timing of receiving the processing start signal and the detection signal differs depending on whether the processing start signal and the detection signal were transmitted from the first in-vehicle antenna 22c or the second in-vehicle antenna 22d, the timing of the start of time measurement ends up being different. Therefore, the transmission timings of the first response signal and the second response signal also end up being somewhat shifted. However, because both the processing start signals and the detection signals are transmitted successively from the first and second in-vehicle antennas 22c, 22d, the shift in transmission timing is slight, and is not a problem. The plurality of portable devices 3 can transmit the first response signals at roughly the same timing, and can transmit the second response signals at timings at which they do not interfere.

The embodiments disclosed here are exemplary in every aspect, and should be considered as not being restrictive. The scope of the invention is indicated by the scope of the claims, not the meanings described above, and it is intended that equivalents of the claim scope, and all modifications within the scope, are included.

DESCRIPTION OF SYMBOLS 1 on-board device
2 portable device
10 on-board control unit
11 on-board reception unit
12 on-board transmission unit
13 storage unit for on-board device
14 timer unit for on-board device
21 RF reception antenna
22 LF transmission antenna
22a driver's seat antenna
22b passenger's seat antenna
22c first in-vehicle antenna
22d second in-vehicle antenna
22e back door antenna
31 first portable device
31a portable control unit
31b portable reception unit
31c received signal strength detection unit
31d reception antenna
31e portable transmission unit
31f RF transmission antenna
31g storage unit for portable device
31h timer unit for portable device
32 second portable device
33 third portable device
34 fourth portable device
35 fifth portable device
36 sixth portable device
41 driver's door switch
42 passenger's door switch
43 back door switch
44 engine start switch
C vehicle

What is claimed is:

1. An on-board communication system comprising (i) an on-board device that transmits detection signals from a plurality of antennas provided in a vehicle and (ii) a portable device that receives the detection signals transmitted from the on-board device and transmits a response signal corresponding to the received detection signals, the on-board device performing position detection of the portable device by receiving the response signal transmitted from the portable device, wherein:
the on-board device comprises an on-board transmission unit that (i) prior to transmission of the detection signals, successively transmits from the plurality of antennas, at a different timing for each of the plurality of antennas, processing start signals for starting reception processing of the detection signals by the portable device, and (ii) after transmission of the processing start signals, successively transmits the detection signals from the plurality of antennas, at a different timing for each of the plurality of antennas, without waiting for a response from the portable device that received the processing start signals;
the portable device comprises:
a portable reception unit that receives the processing start signals transmitted by the on-board transmission unit and, in response to the received processing start signals, receives the detection signals transmitted by the on-board transmission unit, and
a portable transmission unit that, when the portable reception unit has received the detection signals, transmits the response signal, which includes information corresponding to the received detection signals;
the plurality of antennas includes (i) a plurality of in-vehicle antennas that transmit, primarily to the inside of the vehicle, the processing start signals and the detection signals, and (ii) a plurality of out-of-vehicle antennas that transmit, primarily to the outside of the vehicle, the detection signals; and
in order to confirm that the portable device is present inside the vehicle, the on-board transmission unit successively transmits the processing start signals only from the plurality of in-vehicle antennas, at a different timing for each of the plurality of in-vehicle antennas, and successively transmits the detection signals from the plurality of in-vehicle antennas and out-of-vehicle antennas, at a different timing for each of the plurality of in-vehicle antennas and out-of-vehicle antennas.

2. The on-board communication system according to claim 1, wherein the plurality of in-vehicle antennas that has transmitted the processing start signals transmits the detection signals after the detection signals have been transmitted from the plurality of out-of-vehicle antennas.

3. The on-board communication system according to claim 2, wherein:
the portable device comprises a plurality of the portable devices, and
when the portable reception units of the plurality of the portable devices have received the detection signals, the portable transmission units of the plurality of portable devices each transmit, at different points in time, (i) a first response signal that includes information corresponding to the received detection signals and (ii) a second response signal that includes the same information as the information included in the first response signal.

4. The on-board communication system according to claim 1, wherein:
the portable device comprises a plurality of the portable devices, and
when the portable reception units of the plurality of the portable devices have received the detection signals, the portable transmission units of the plurality of portable devices each transmit, at different points in time, (i) a first response signal that includes information corresponding to the received detection signals and (ii) a second response signal that includes the same information as the information included in the first response signal.

5. The on-board communication system according to claim 1, wherein when it is confirmed that the portable device is present inside the vehicle, engine start processing of the vehicle is performed.

6. An on-board device that transmits detection signals from a plurality of antennas provided in a vehicle, and performs position detection of an external portable device by receiving a response signal, transmitted from the portable device in response to the detection signals, the on-board device comprising:
   a detection signal transmission unit that (i) prior to transmission of the detection signals, successively transmits from the plurality of antennas, at a different timing for each of the plurality of antennas, processing start signals for starting reception processing of the detection signals by the portable device, and (ii) after transmission of the processing start signals, successively transmits the detection signals from the plurality of antennas, at a different timing for each of the plurality of antennas, without waiting for a response from the portable device that received the processing start signals;
   wherein the plurality of antennas includes (i) a plurality of in-vehicle antennas that transmit, primarily to the inside of the vehicle, the processing start signals and the detection signals, and (ii) a plurality of out-of-vehicle antennas that transmit, primarily to the outside of the vehicle, the detection signals; and
   in order to confirm that the portable device is present inside the vehicle, the on-board transmission unit successively transmits the processing start signals only from the plurality of in-vehicle antennas, at a different timing for each of the plurality of in-vehicle antennas, and successively transmits the detection signals from the plurality of in-vehicle antennas and out-of-vehicle antennas, at a different timing for each of the plurality of in-vehicle antennas and out-of-vehicle antennas.

7. The on-board device according to claim 6, wherein when it is confirmed that the portable device is present inside the vehicle, engine start processing of the vehicle is performed.

* * * * *